United States Patent [19]
Okino et al.

[11] Patent Number: 5,745,811
[45] Date of Patent: Apr. 28, 1998

[54] IMAGE RECORDING DEVICE, DEVELOPING DEVICE AND IMAGE RECORDING SYSTEM

[75] Inventors: Yoshiharu Okino; Masahiro Asami, both of Kanagawa, Japan

[73] Assignee: Fuji Photo Film Co., Ltd., Kanagawa, Japan

[21] Appl. No.: 823,311

[22] Filed: Mar. 21, 1997

[30] Foreign Application Priority Data

Mar. 27, 1996 [JP] Japan .................. 8-072913

[51] Int. Cl.⁶ .................. G03B 17/24; G03D 13/00; G03D 15/04
[52] U.S. Cl. .................. 396/315; 396/567; 396/578; 396/613
[58] Field of Search .................. 396/315, 567, 396/570, 613, 578

[56] References Cited

U.S. PATENT DOCUMENTS

| | | |
|---|---|---|
| 5,227,837 | 7/1993 | Terashita .................. 396/315 |
| 5,307,108 | 4/1994 | Yamanouchi et al. .................. 396/315 |
| 5,493,354 | 2/1996 | Watanabe et al. .................. 396/315 |
| 5,671,452 | 9/1997 | Seikai .................. 396/315 X |

*Primary Examiner*—W. B. Perkey
*Attorney, Agent, or Firm*—Sughrue, Mion, Zinn, Macpeak & Seas, PLLC

[57] ABSTRACT

An image recording system includes an image recording device and a developing device. When a latent image is formed by exposure in a frame on a silver halide photosensitive material, the image recording device records optically recognizable information relating to exposure at a position corresponding to the frame by light of an exposure amount which is sufficient to generate a silver image without developing. The developing device has a reading device for reading the information relating to exposure without photosensitizing the silver halide photosensitive material, and a developing device for developing the latent image in the frame corresponding to read information relating to exposure.

19 Claims, 23 Drawing Sheets

F I G. 2
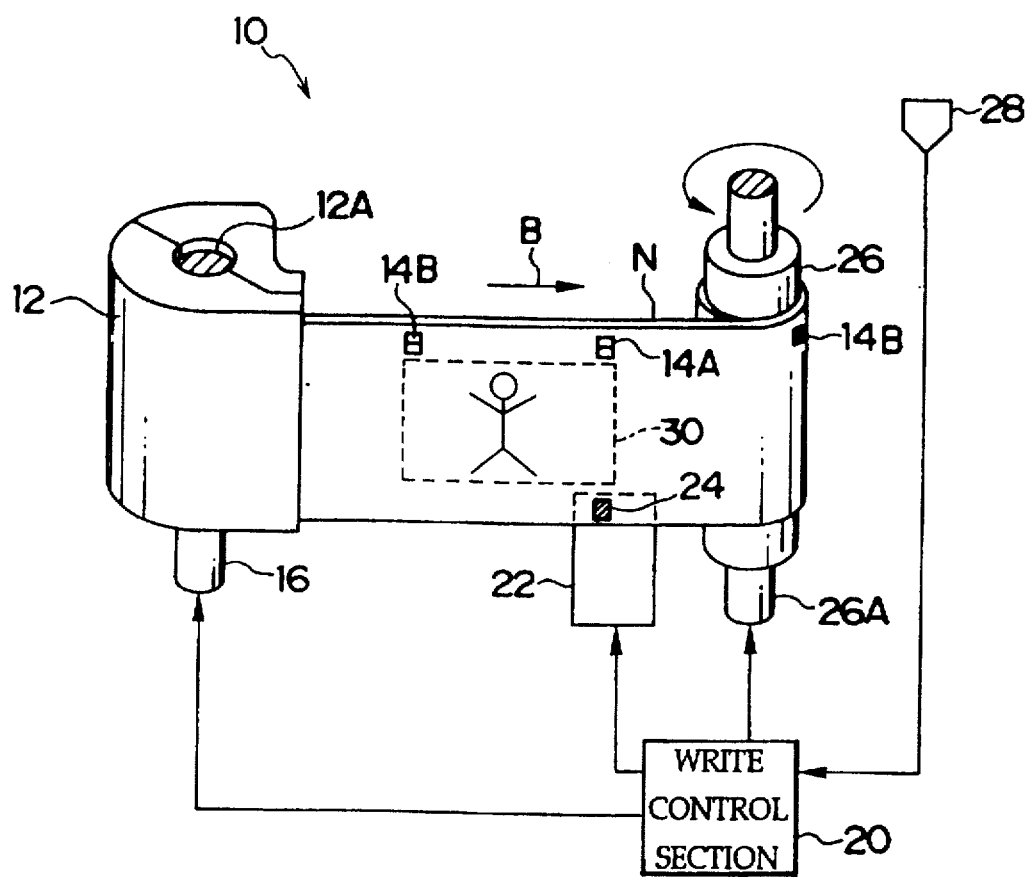

F I G. 6A
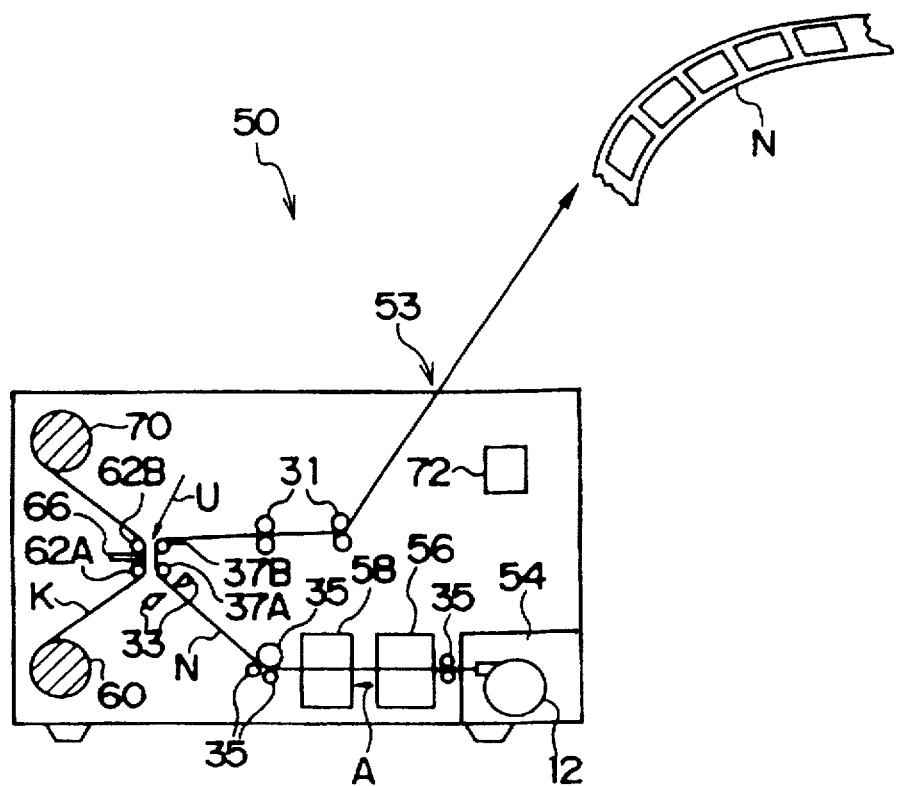
F I G. 6B
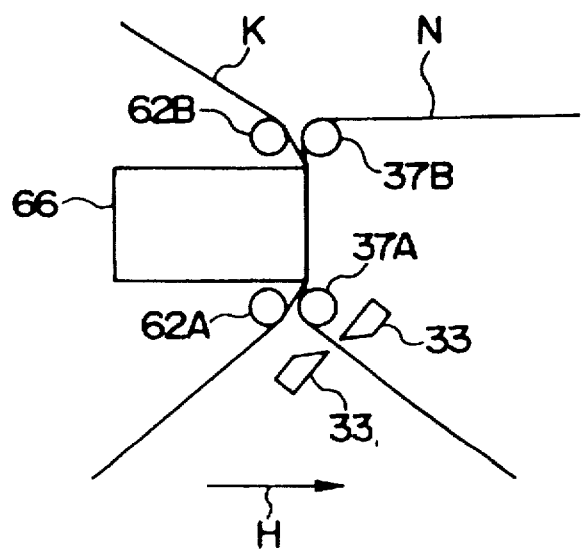

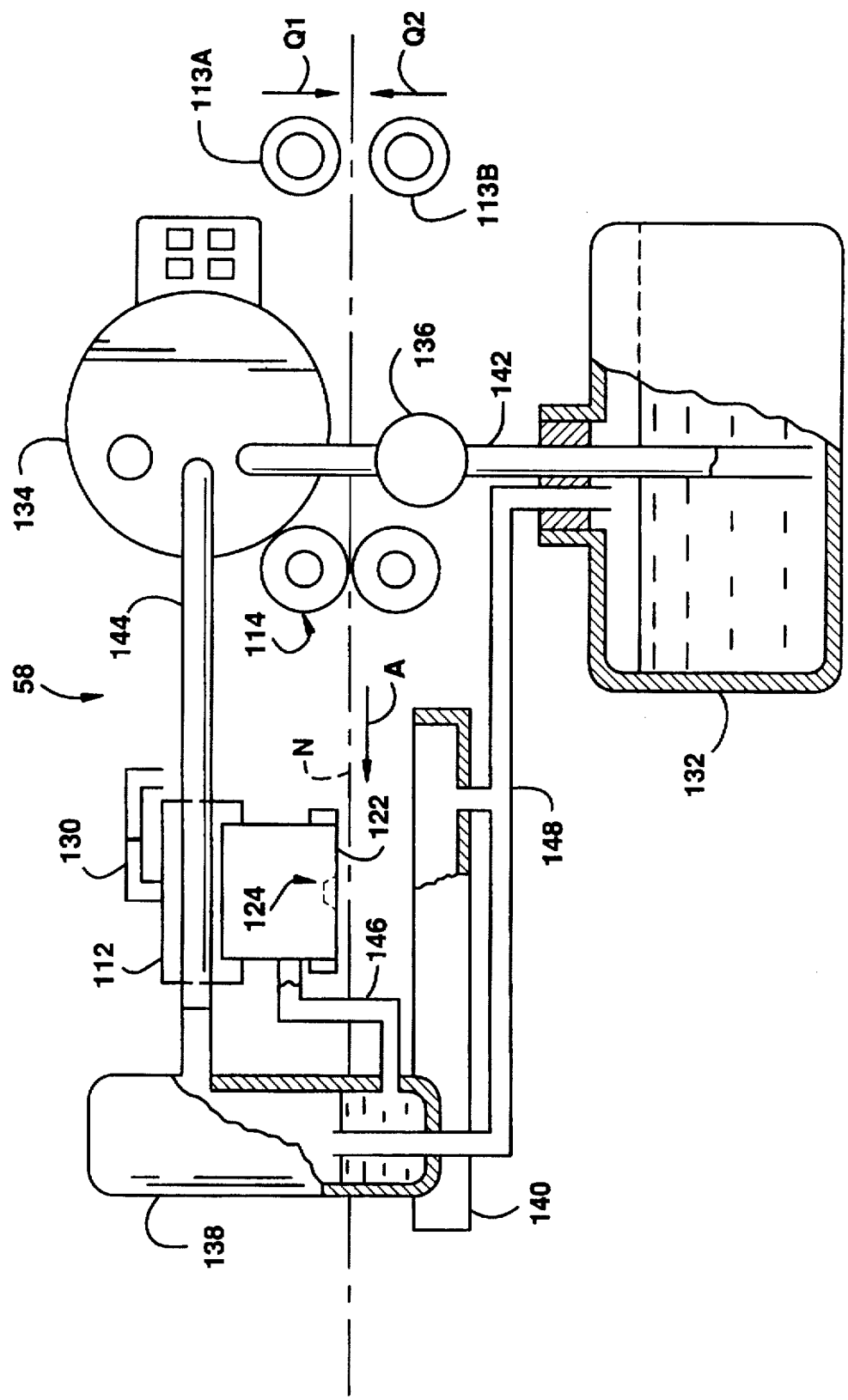

F I G. 1 0
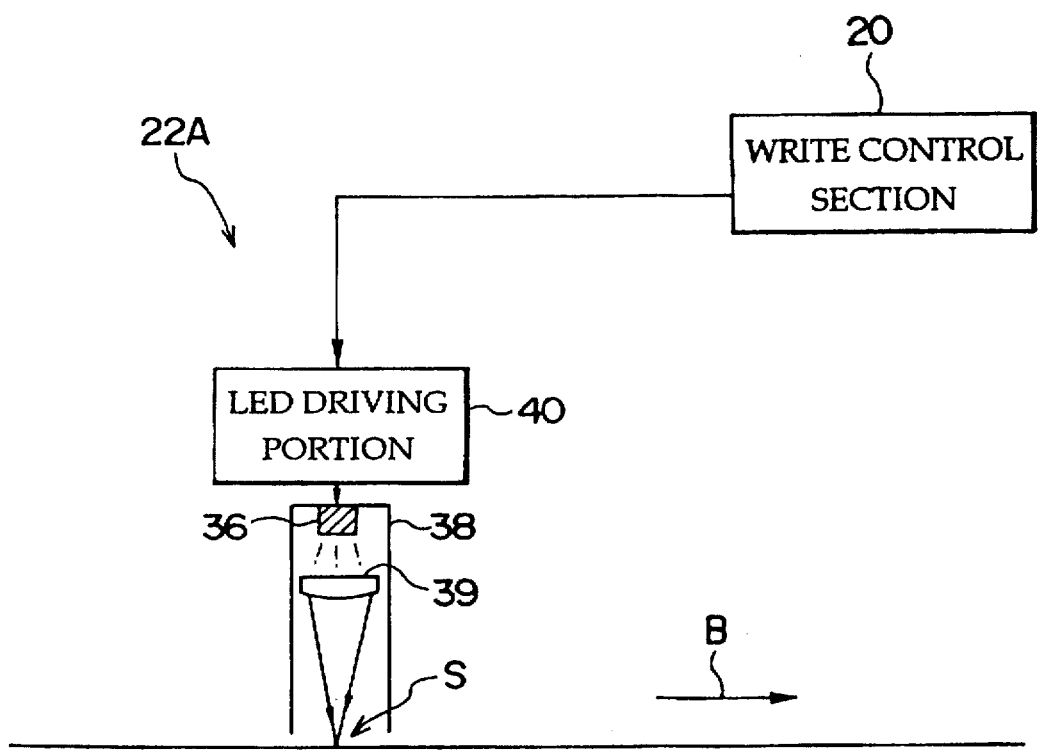

F I G. 1 2
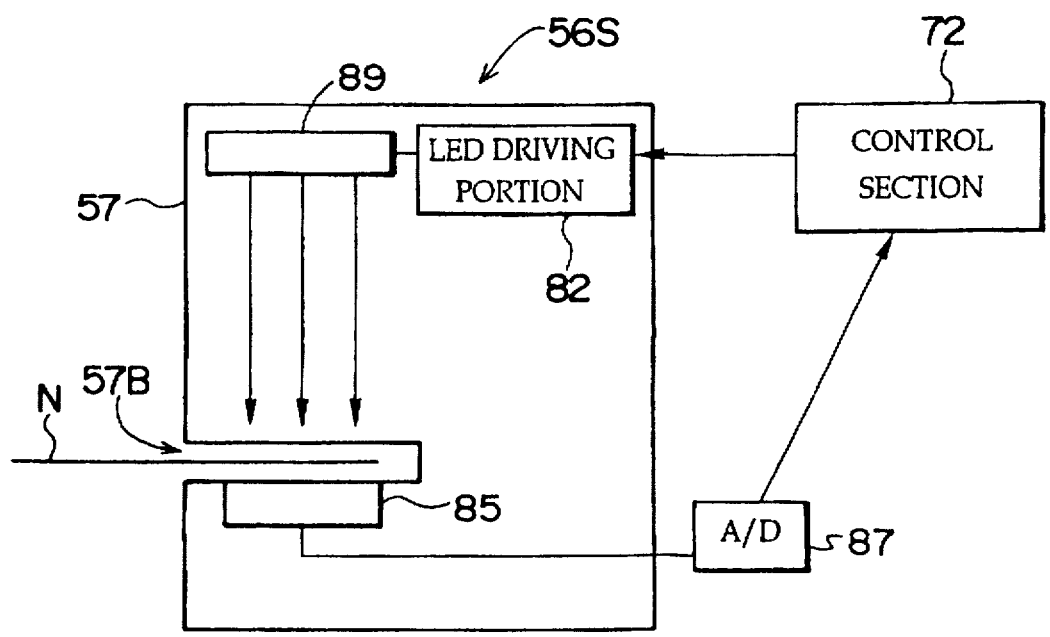

F I G. 1 4 A
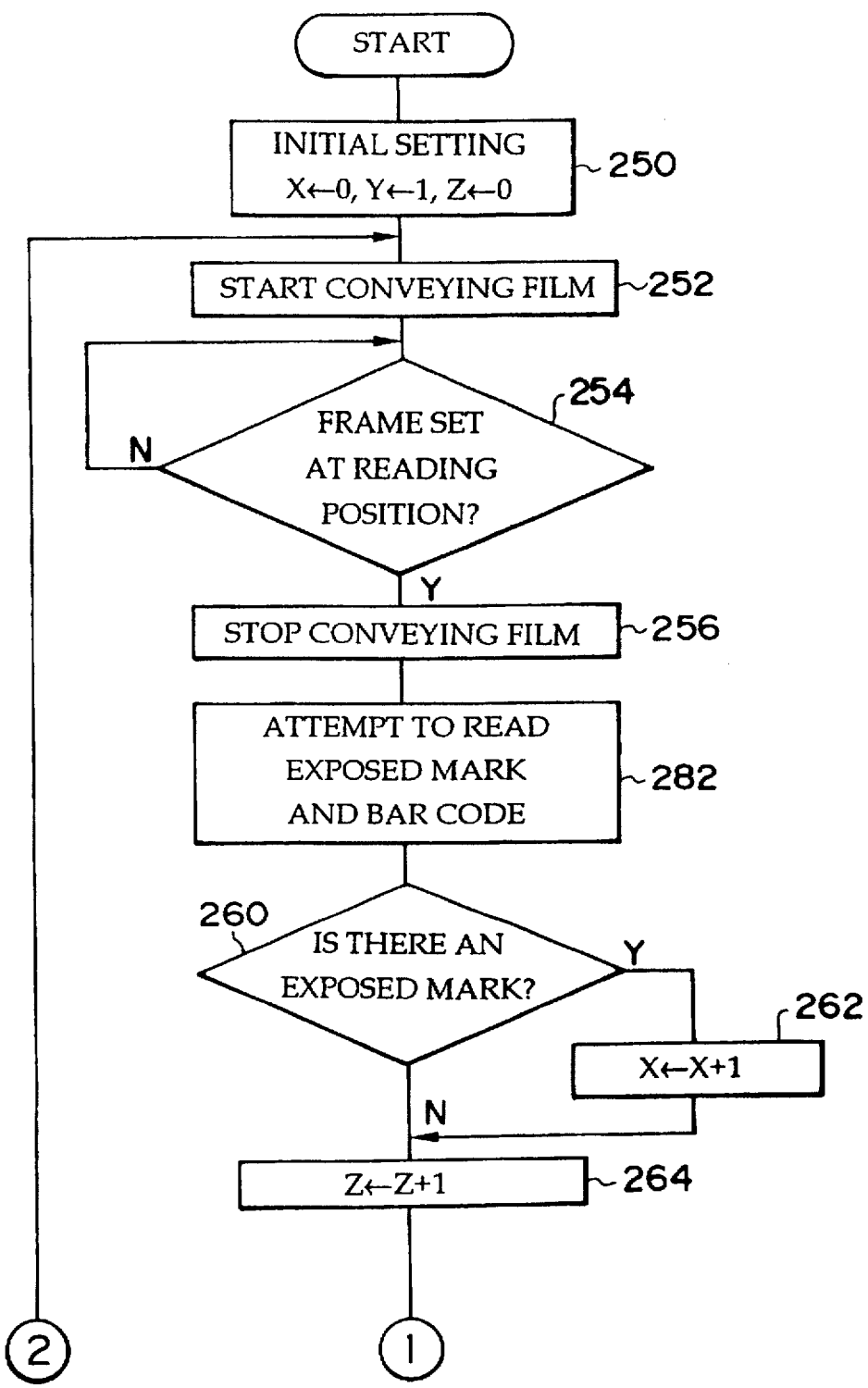

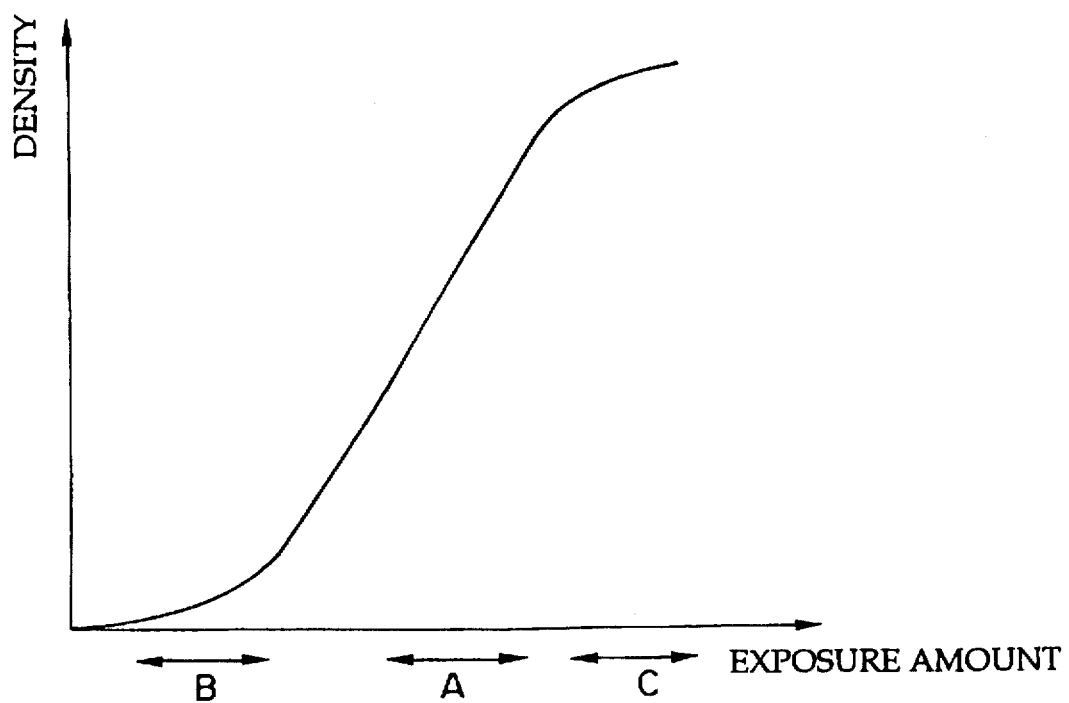
F I G. 1 5

F I G. 1 6
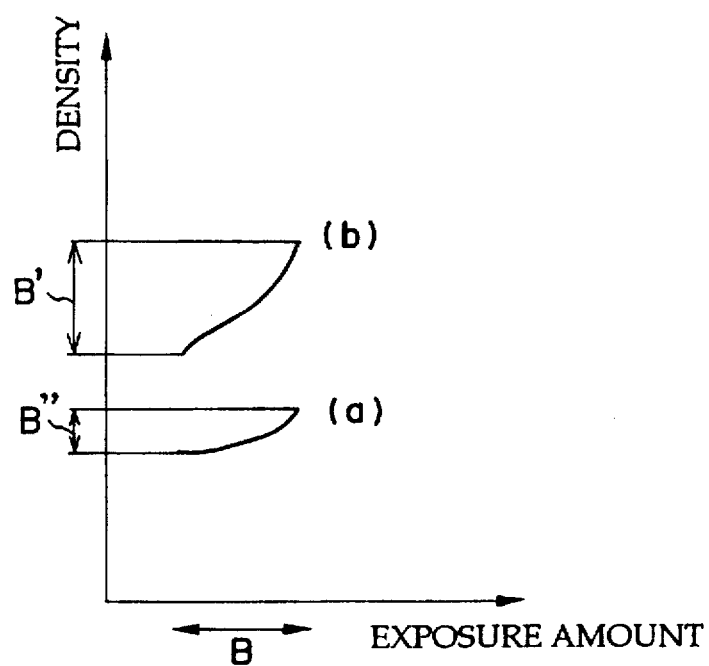
F I G. 1 7
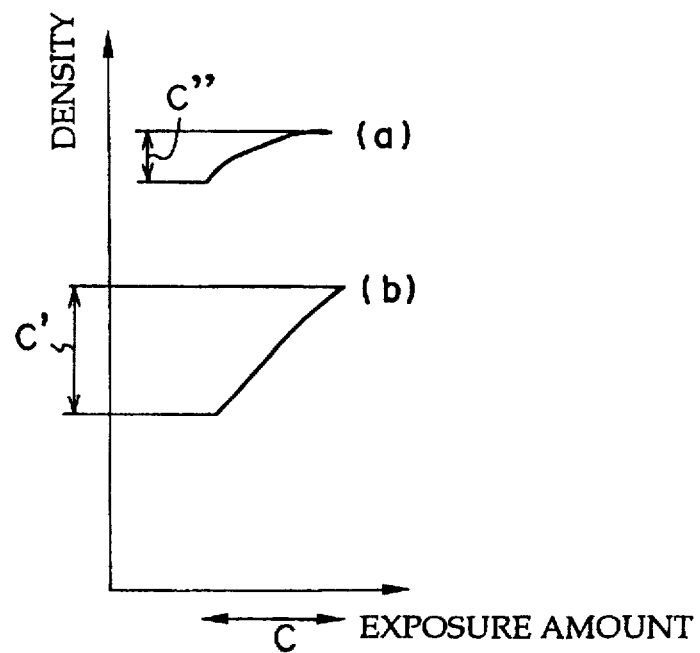

F I G. 1 8
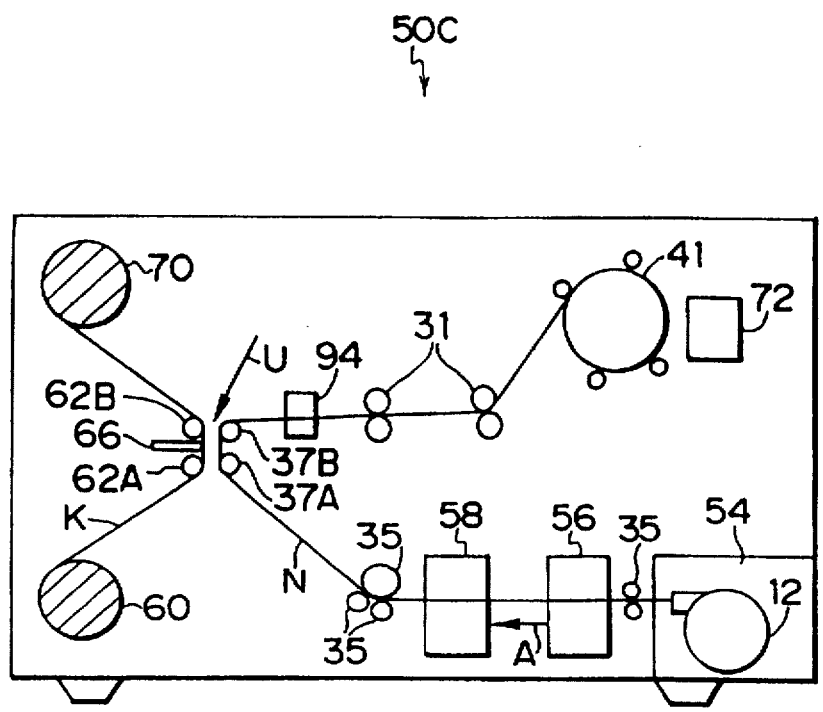

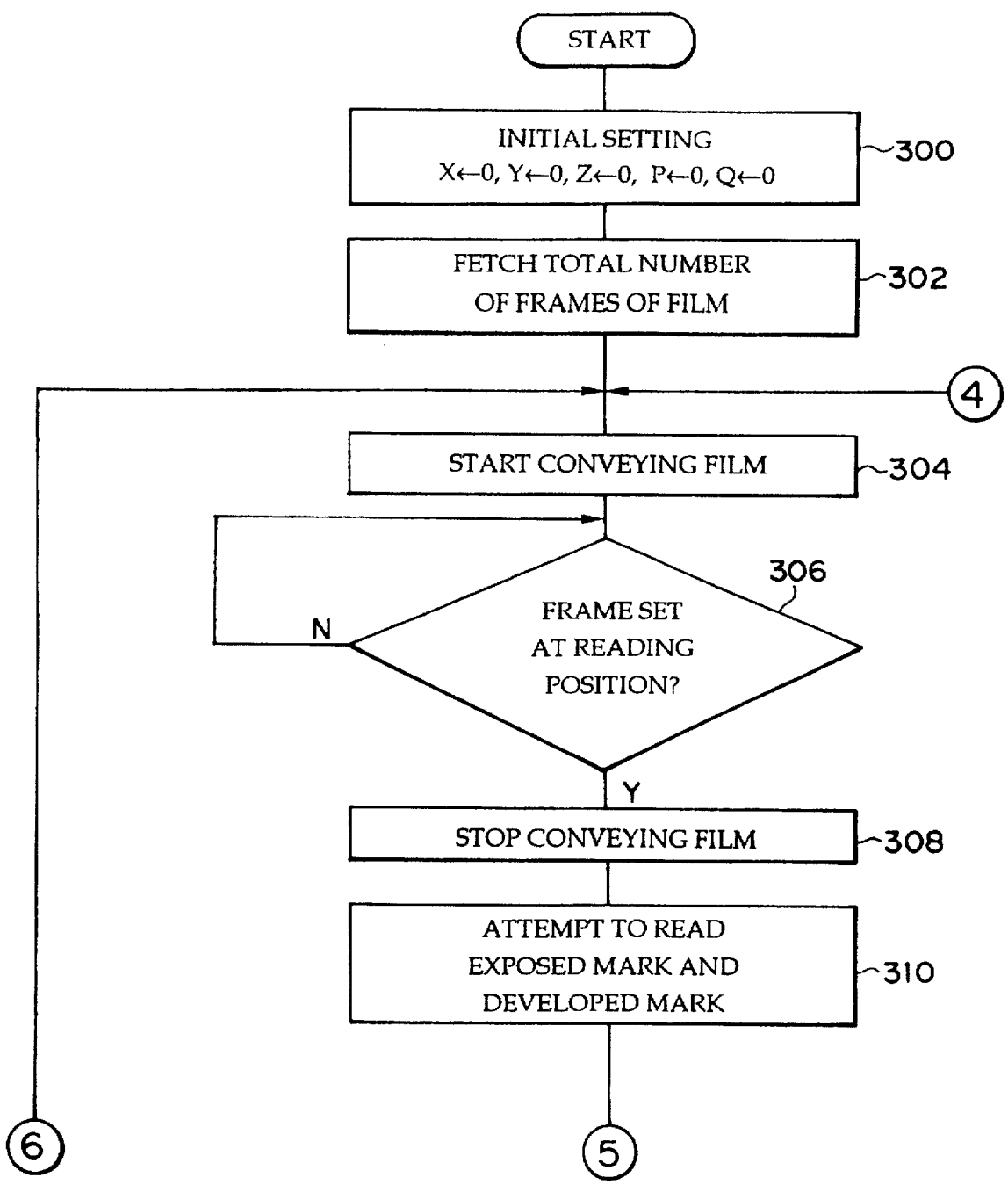

IMAGE RECORDING DEVICE, DEVELOPING DEVICE AND IMAGE RECORDING SYSTEM

BACKGROUND OF THE INVENTION

1. Field of the Invention

The present invention relates to an image recording device, a developing device, and an image recording system. In particular, the present invention relates to an image recording device which, when a latent image is formed, records optically recognizable information relating to exposure onto a silver halide photosensitive material by light of an exposure amount which is sufficient to form a silver image without developing, and relates to a developing device which develops a latent image in a frame corresponding to the information relating to exposure from the silver halide photosensitive material, and to an image recording system equipped with the image recording device and the developing device.

2. Description of the Prior Art

Conventionally, mainly silver halide photosensitive materials are used as photographic films which are photographed by a camera or the like. A latent image is formed in the photographed (exposed) portion of the silver halide photosensitive material. After photographing, the silver halide photosensitive material is subjected to developing, fixing, washing and other processings (wet-type processing), so that a readable image is formed.

It has conventionally been necessary for information relating to exposure, such as the date and time of exposure or the shutter speed or the like, either to be recorded on the silver halide photosensitive material as magnetic information by an expensive magnetic information recording device built in the camera, or to be recorded by hand in a management ledger or the like provided separately from the silver halide photosensitive material.

Further, the aforementioned wet-type processing is carried out for one whole silver halide photosensitive material. If wet-type processing is carried out once, the unexposed portions of the silver halide photosensitive material cannot be reused. More specifically, when silver halide photosensitive materials are subjected to developing processing by conventional wet-type processing, it is impossible to develop only the exposed portions.

SUMMARY OF THE INVENTION

The present invention was devised in order to solve the above-described drawbacks, and an object of the present invention is to provide an image recording device which easily records information relating to exposure on a silver halide photosensitive material, and to provide a developing device which easily reads the information relating to exposure from the silver halide photosensitive material and changes exposure conditions on the basis of the read information, and to provide an image recording system utilizing the image recording device and the developing device.

Another object of the present invention is to provide a developing device which develops only exposed portions, and an image recording system using the developing device.

Usually, a latent image is formed by exposure on silver halide photosensitive materials which are used as photographic films at the time of photographing (exposure) by a camera or the like, and a visible image is obtained by developing processing. Silver halide photosensitive materials have the characteristic that, when light of a light amount of about two times to about ten times or more of the light amount for obtaining the maximum density which can be obtained on the photosensitive material is illuminated onto the photosensitive material, silver images can be formed at the portions to which the light is illuminated even if developing processing is not carried out.

The present invention was obtained by utilizing this characteristic to achieve the above-described objects.

A first aspect of the present invention is an image recording device which, when a latent image is formed by exposure in a frame on a silver halide photosensitive material, records optically recognizable information relating to exposure at a position corresponding to the frame by light of an exposure amount which is sufficient to generate a silver image without developing.

In accordance with the first aspect of the present invention, information relating to exposure, which information is recognizable without developing, can be recorded easily.

A second aspect of the present invention is a developing device comprising: reading means for reading optically recognizable information relating to exposure of a silver halide photosensitive material on which a latent image is formed in a frame, the information relating to exposure being recorded on the silver halide photosensitive material at a position corresponding to the frame by light of an exposure amount which is sufficient to generate a silver image without developing, the reading means reading the information relating to exposure without photosensitizing the silver halide photosensitive material; and developing means for developing the latent image in the frame whose information relating to exposure is read.

In accordance with the second aspect of the present invention, only latent images in exposed frames are developed.

A third aspect of the present invention is an image recording system comprising: an image recording device which, when a latent image is formed by exposure in a frame on a silver halide photosensitive material, records optically recognizable information relating to exposure at a position corresponding to the frame by light of an exposure amount which is sufficient to generate a silver image without developing; and a developing device having: reading means for reading the information relating to exposure without photosensitizing the silver halide photosensitive material, and developing means for developing the latent image in the frame whose information relating to exposure is read.

In accordance with the third aspect of the present invention, information relating to exposure can be easily recorded, and only latent images in exposed frames are developed.

In the second and third aspects of the present invention, when a latent image in an exposed frame is developed, the developing conditions can be changed on the basis of the information relating to exposure.

BRIEF DESCRIPTION OF THE DRAWINGS

FIG. 2 is a block diagram illustrating structural elements in the camera of FIG. 1 which record an exposed mark.

which shows that a frame has been exposed, at a position corresponding to the frame which has been exposed on the negative film.

Figure 1:
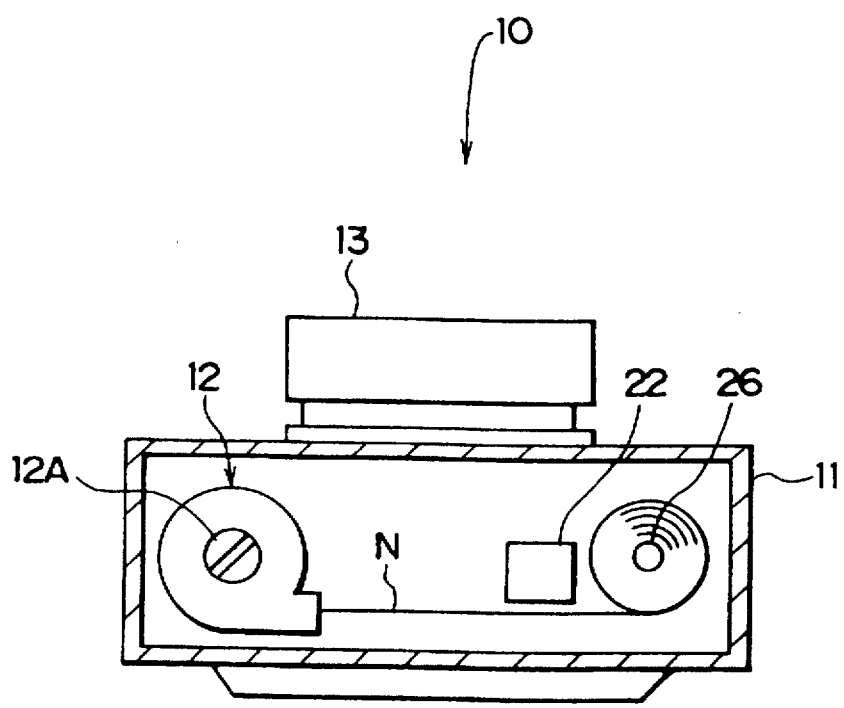
FIG. 1 is a schematic sectional view of a camera, in which a negative film is loaded and which forms an image recording device of an image recording system relating to a first embodiment of the present invention, the camera being cut horizontally in this schematic sectional view.
Figure 3:
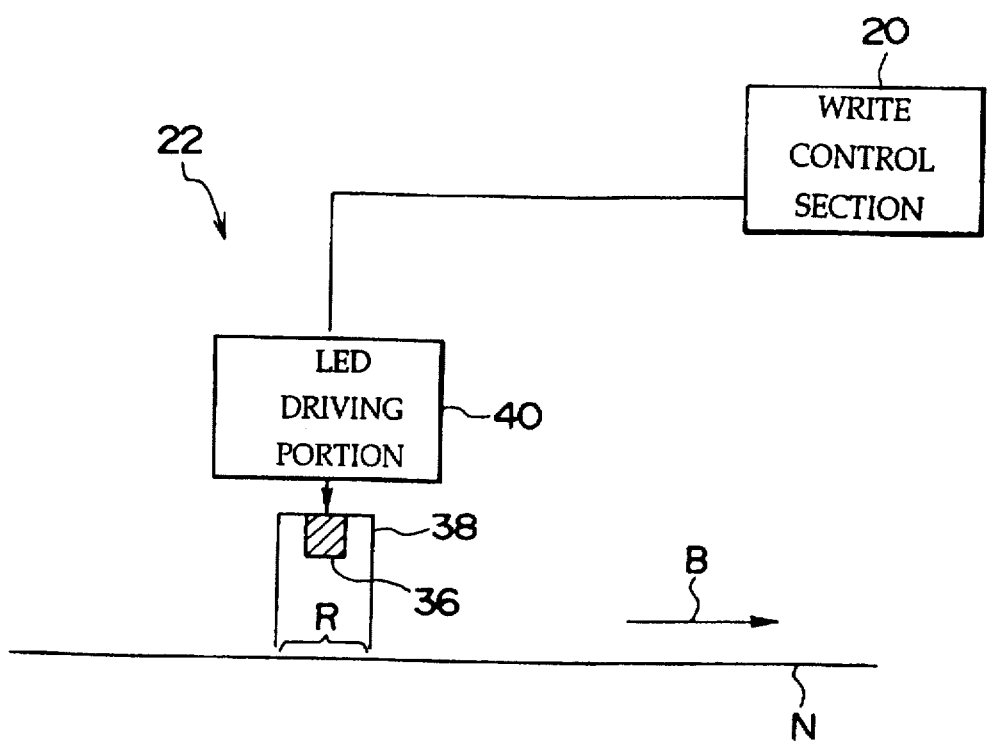

FIG. 3 is a schematic structural view of an exposure section of the camera of FIG. 1.

Figure 4:
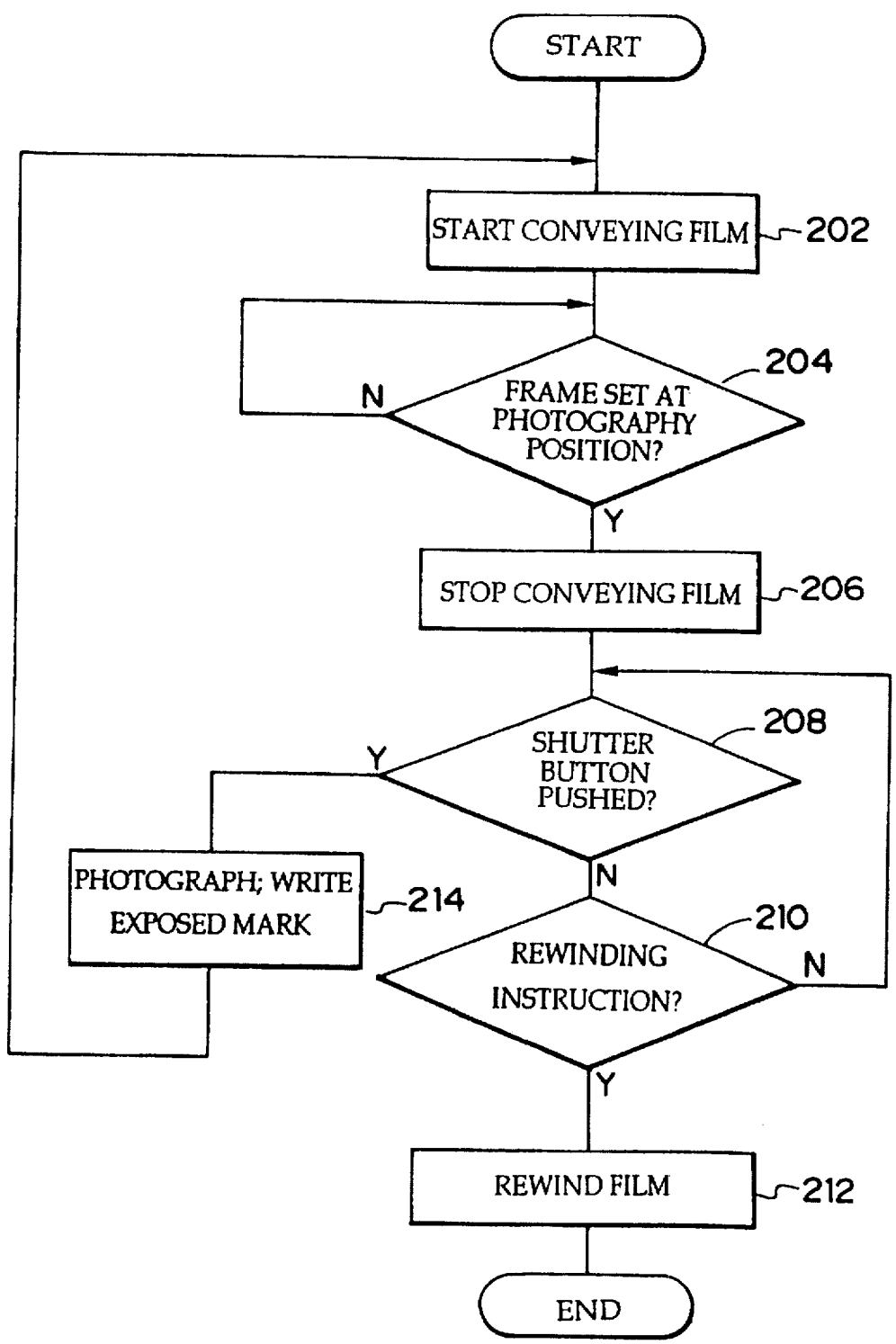

FIG. 4 is a flowchart illustrating a control routine executed by a write control section in the camera of FIG. 1.

Figure 5:
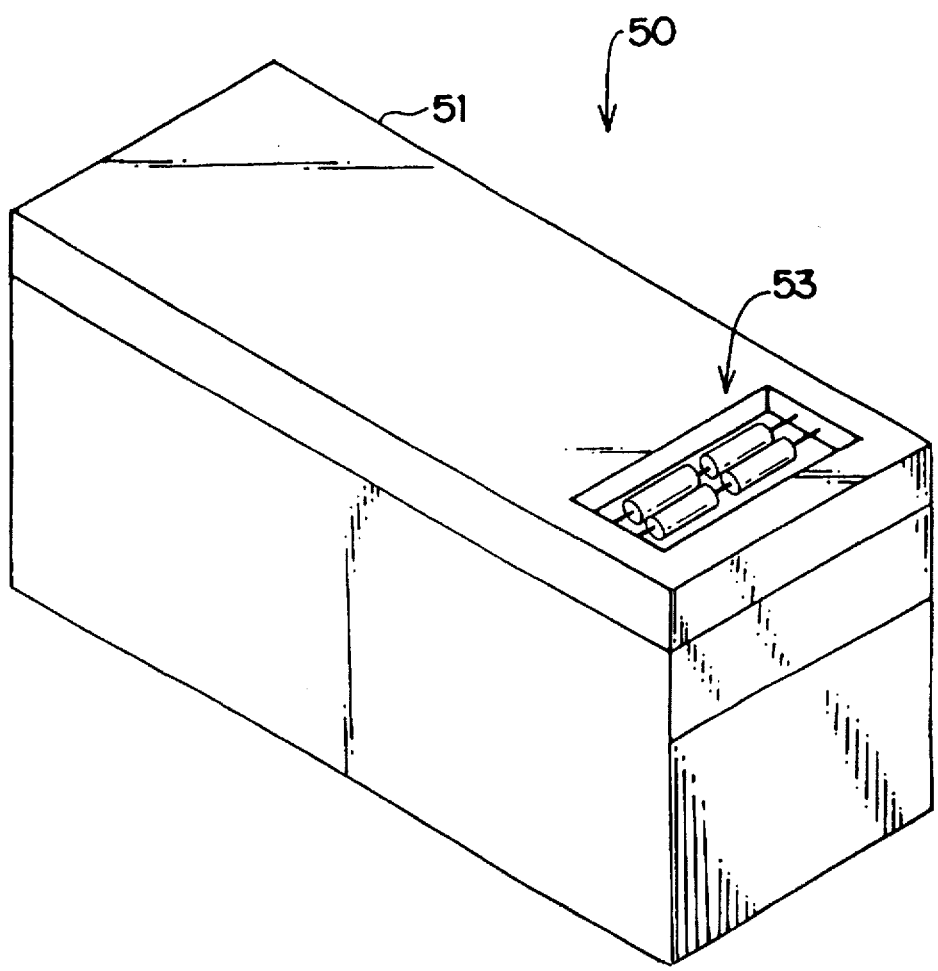

FIG. 5 is a perspective view illustrating the exterior of a developing device in the image recording system relating to the first embodiment of the present invention.

FIG. 6A is a schematic structural view of the developing device of FIG. 5.

FIG. 6B is an enlarged view of a heating section U included in the developing device of FIG. 6A, and illustrates the arrangement of structural elements of the heating section U at the time of heating.

Figure 7A:
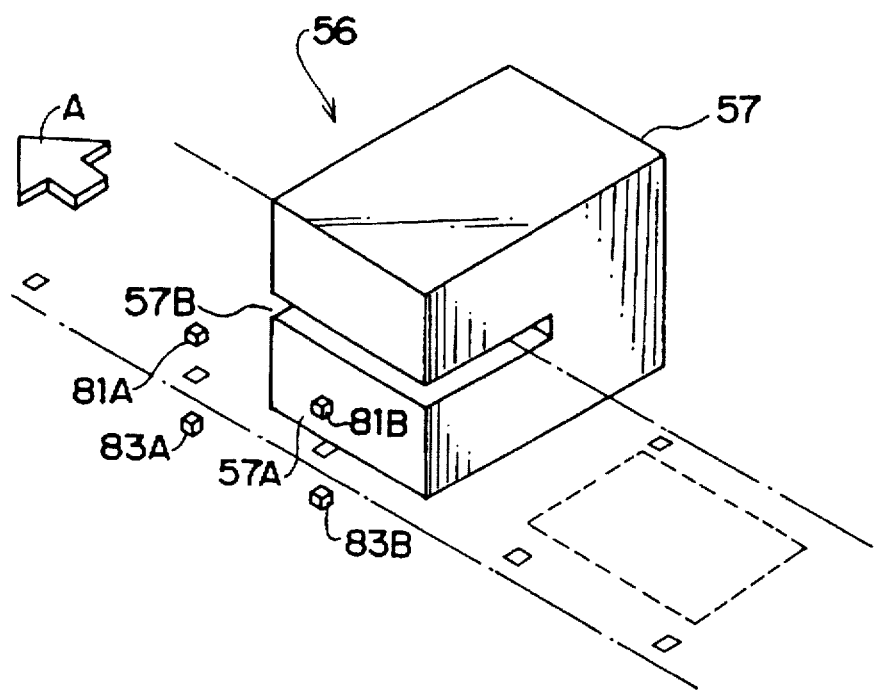

FIG. 7A is a perspective view illustrating the exterior of a reading section of the developing device of FIG. 5.

Figure 7B:
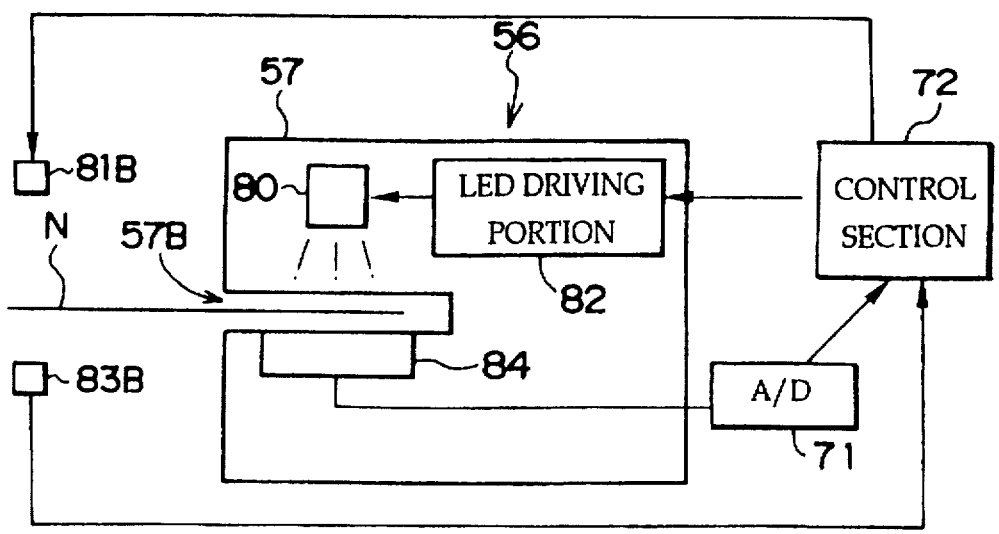

FIG. 7B is a schematic block diagram of the reading section of FIG. 7A.

FIG. 8 is a schematic structural view of an application section of the developing device of FIG. 5.

Figure 9A:
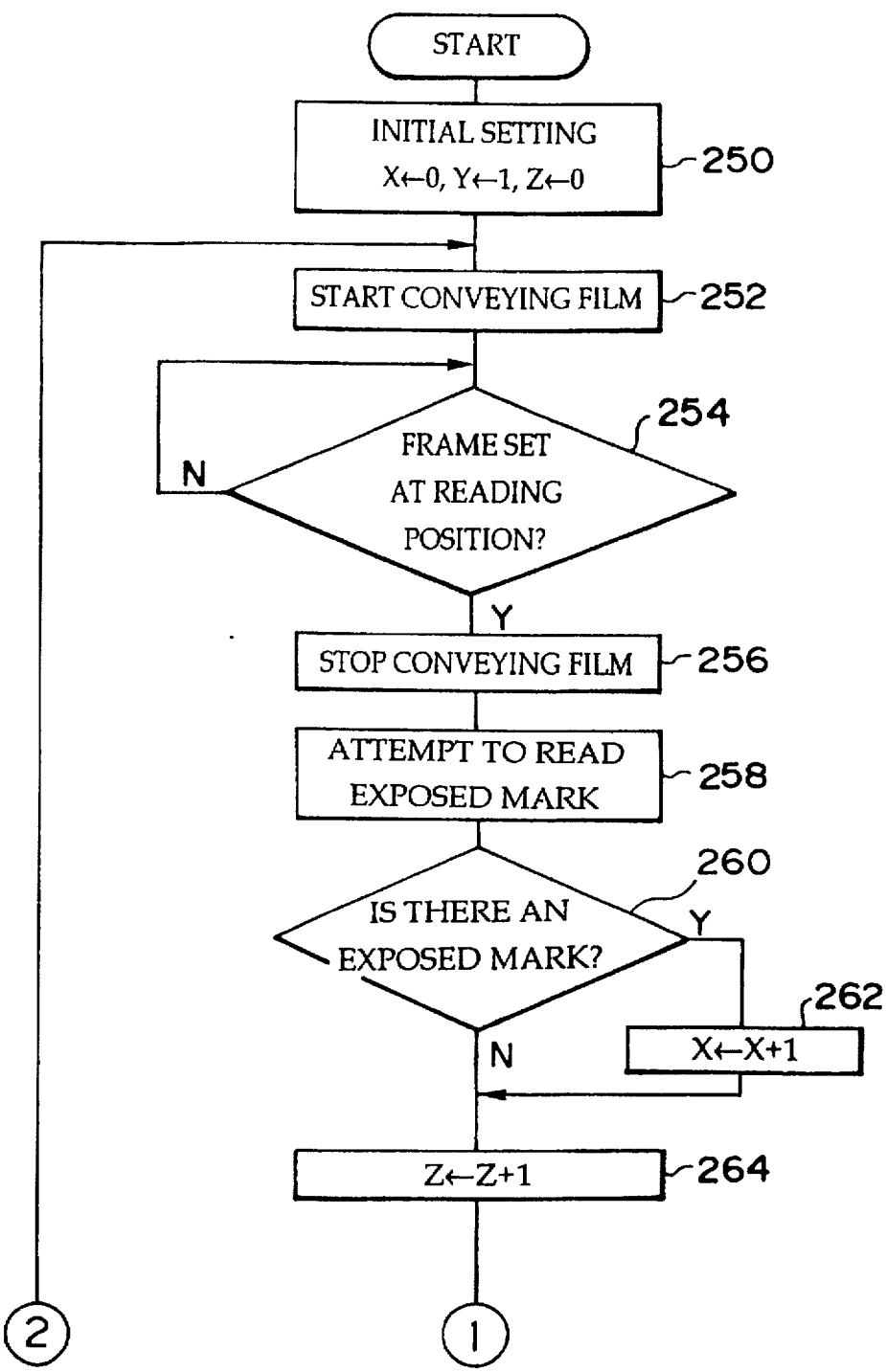

FIG. 9A is a flowchart illustrating a control routine executed by a control section in the developing device of FIG. 5.

Figure 9B:
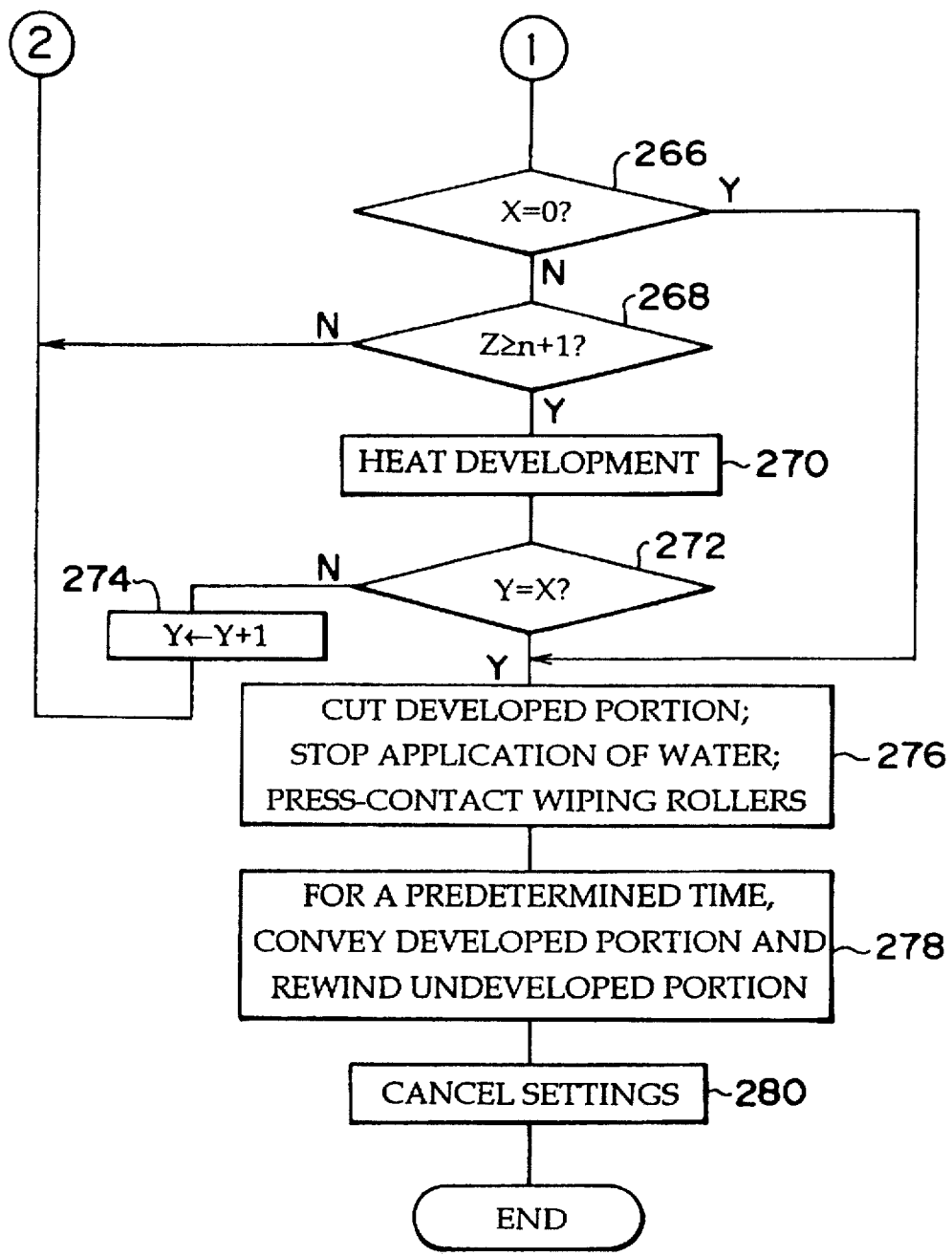

FIG. 9B is a continuation of the control routine of FIG. 9A.

FIG. 10 is a schematic structural view of an exposure section of a camera forming an image recording device in an image recording system relating to a second embodiment of the present invention.

Figure 11:
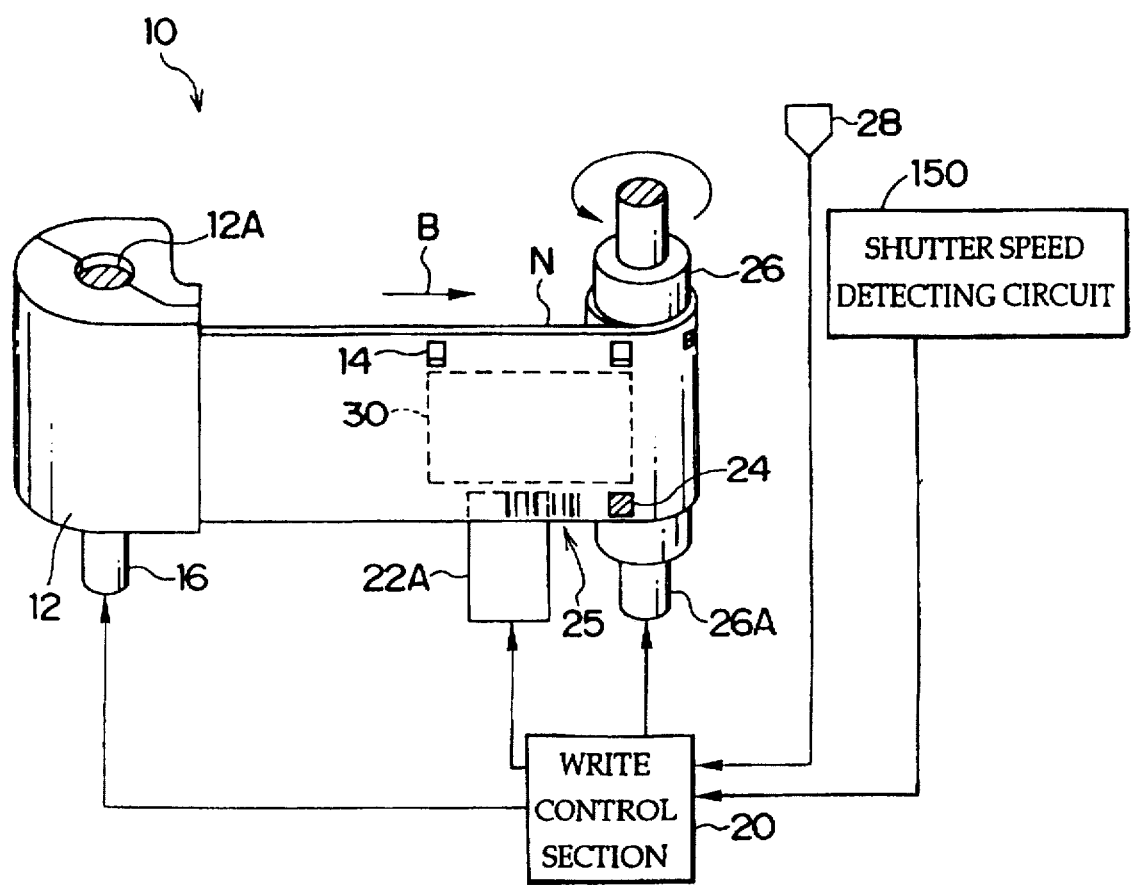

FIG. 11 is a block diagram illustrating structural elements for recording a bar code and an exposed mark, which shows that a frame has been exposed, at positions corresponding to the frame which has been exposed on a negative film.

FIG. 12 is a schematic block diagram of a reading section in the camera of the image recording system of the second embodiment.

Figure 13:
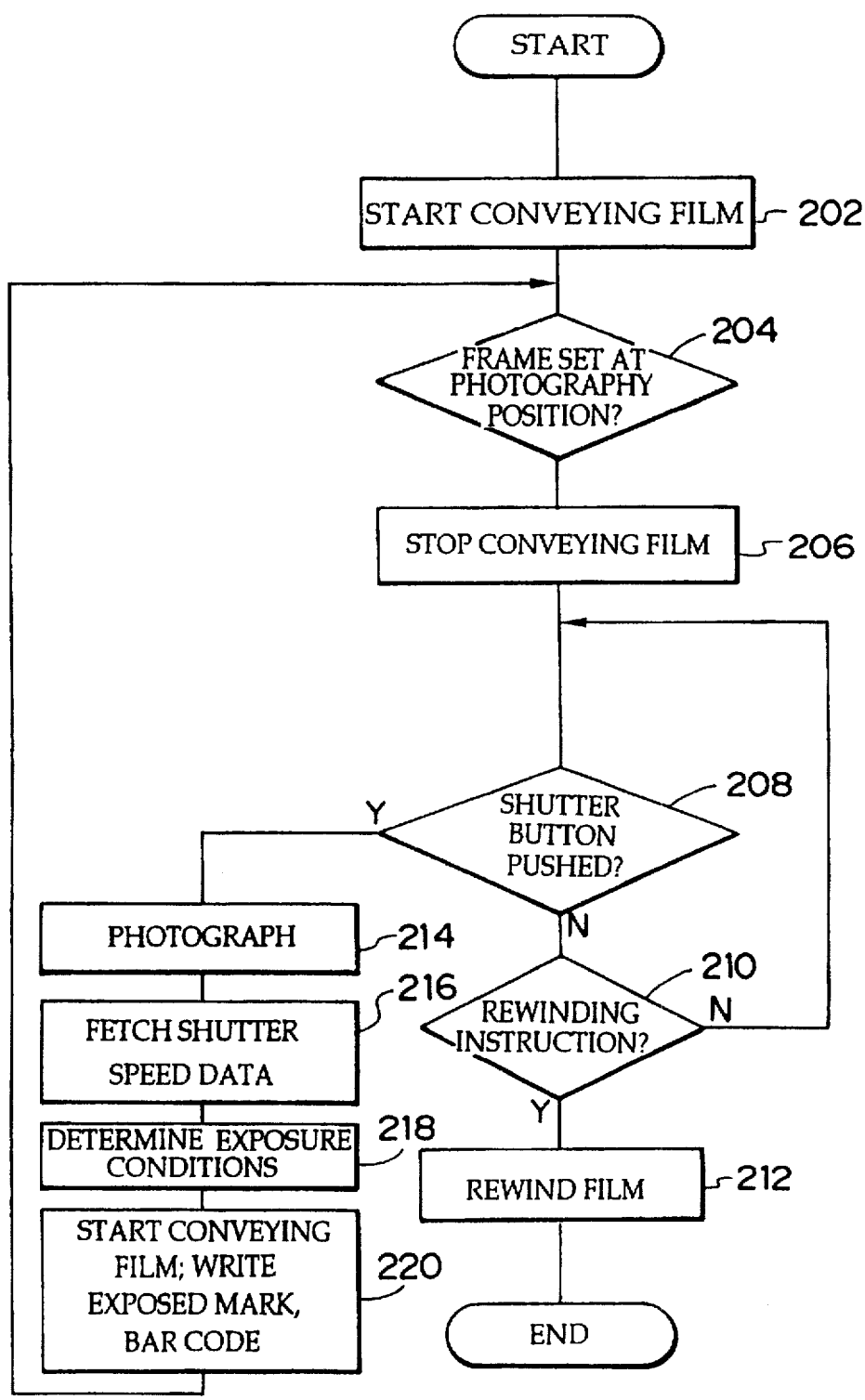

FIG. 13 is a flowchart illustrating a control routine executed by a write control section in the camera of the image recording system of the second embodiment.

FIG. 14A is a flowchart illustrating a control routine executed by a control section in a developing device of the image recording system of the second embodiment.

Figure 14B:
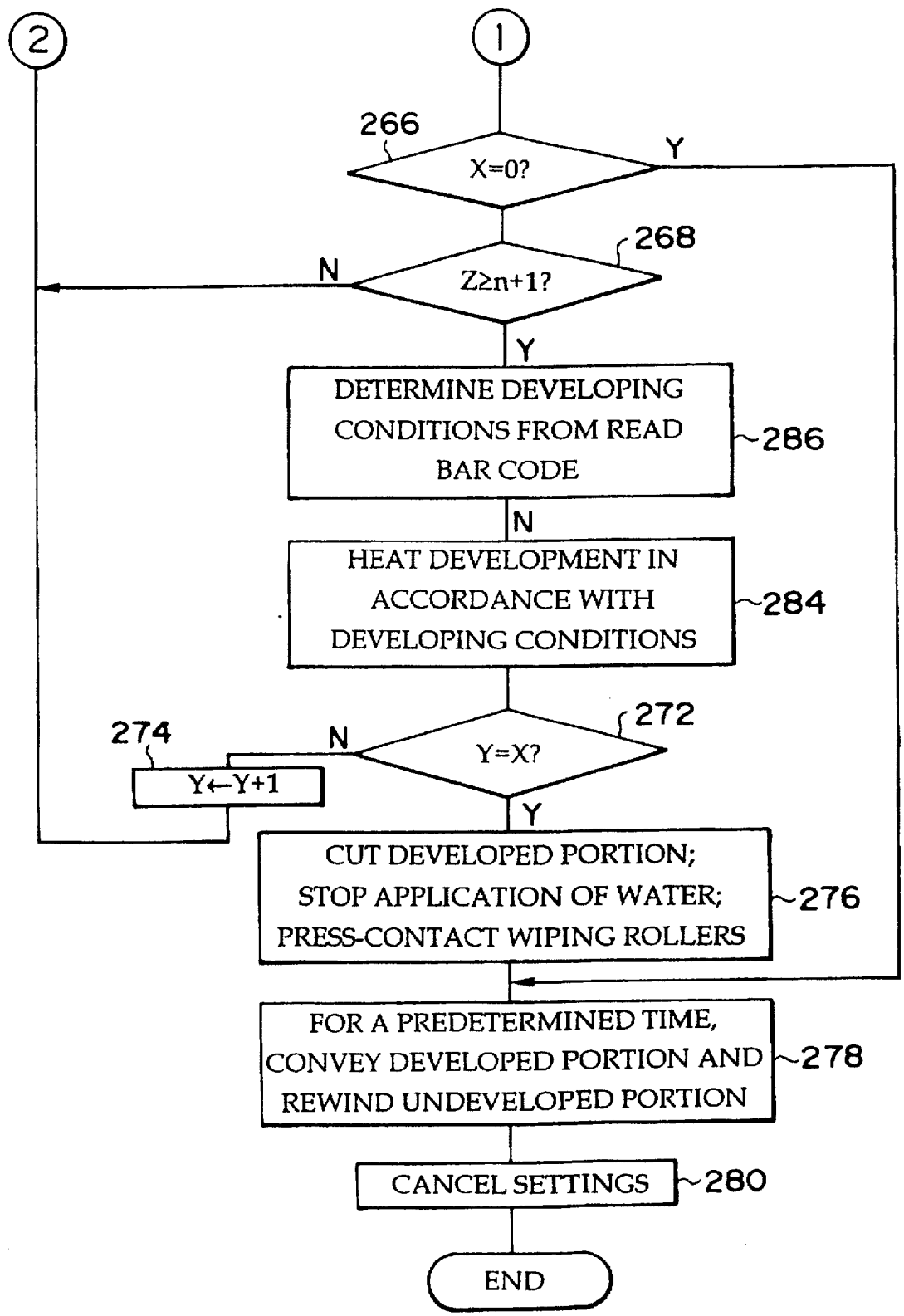

FIG. 14B is a continuation of the control routine of FIG. 14A.

FIG. 15 is a graph illustrating the relationship between color density of a negative film and an amount of exposure in a case in which the negative film is subjected to developing processing under ordinary developing conditions.

FIG. 16 is a graph illustrating the relationship between color density of a negative film and an amount of exposure in a case in which the negative film has been underexposed.

FIG. 17 is a graph illustrating the relationship between color density of a negative film and an amount of exposure in a case in which the negative film has been overexposed.

FIG. 18 is a schematic structural view of a developing device of an image recording system of a third embodiment.

FIG. 19A is a flowchart illustrating a control routine executed by a control section in the developing device of the image recording system of the third embodiment.

Figure 19B:
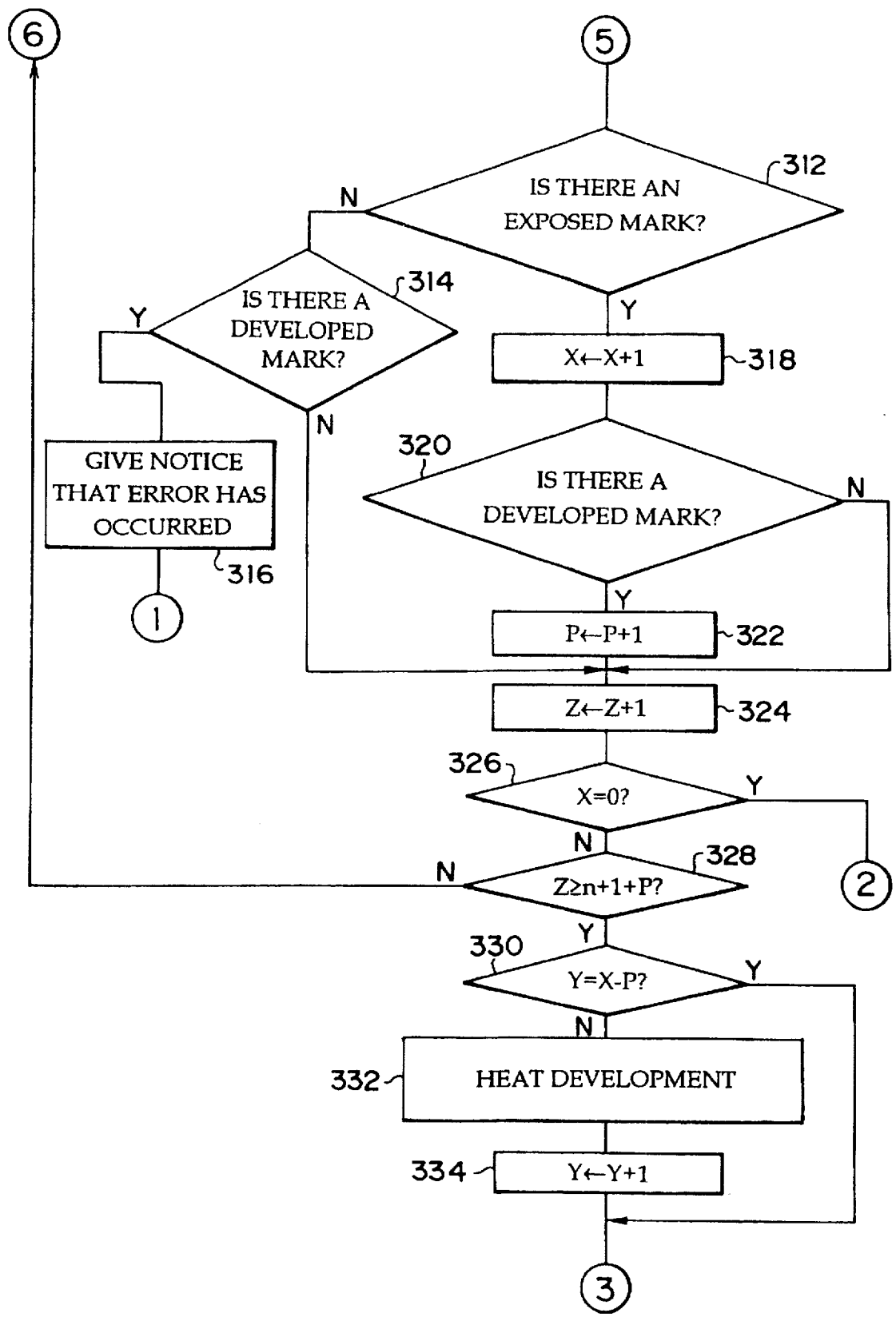

FIG. 19B is a continuation of the control routine of FIG. 19A.

Figure 20:
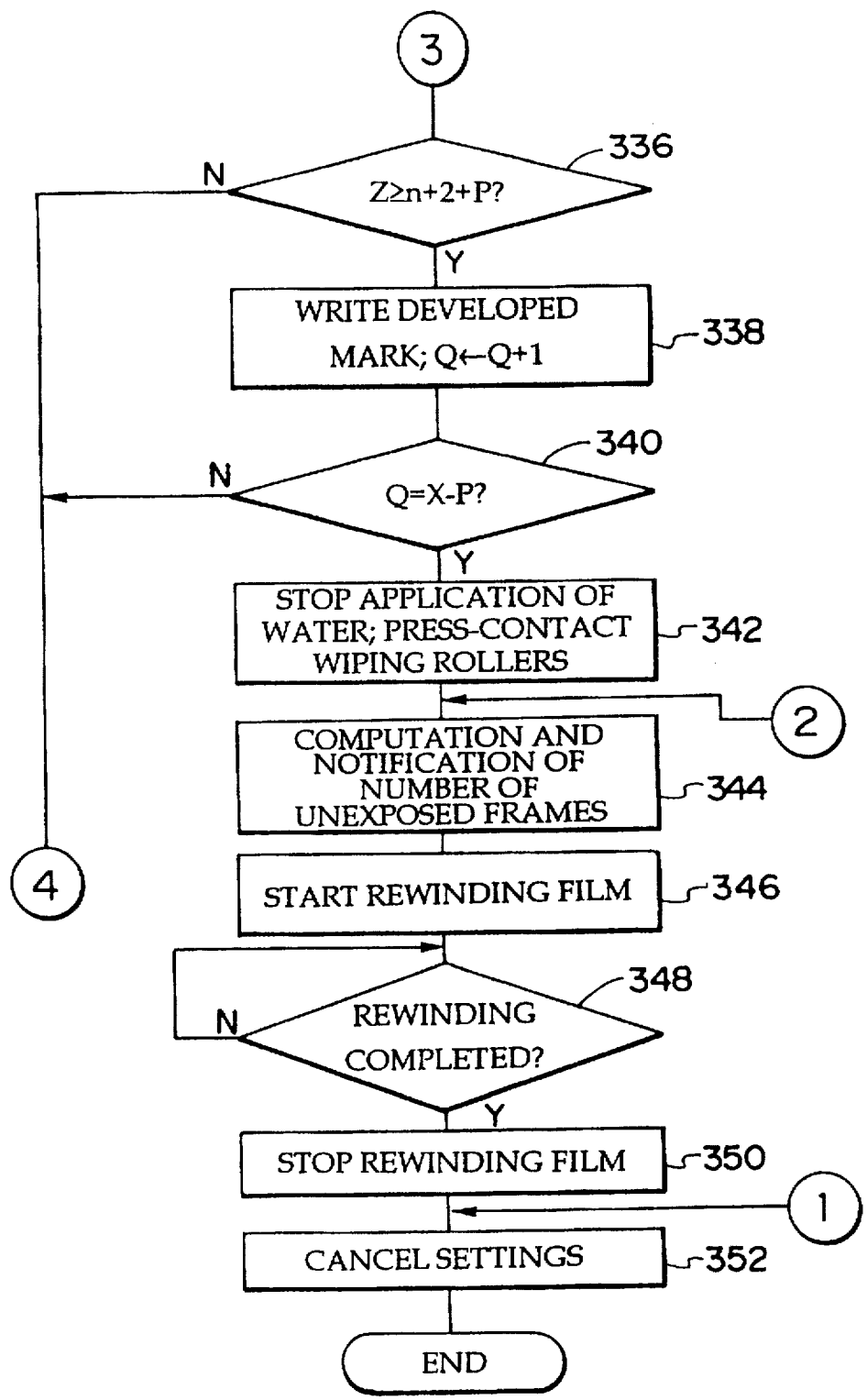

FIG. 20 is a continuation of the control routine of FIG. 19B.

Figure 21:
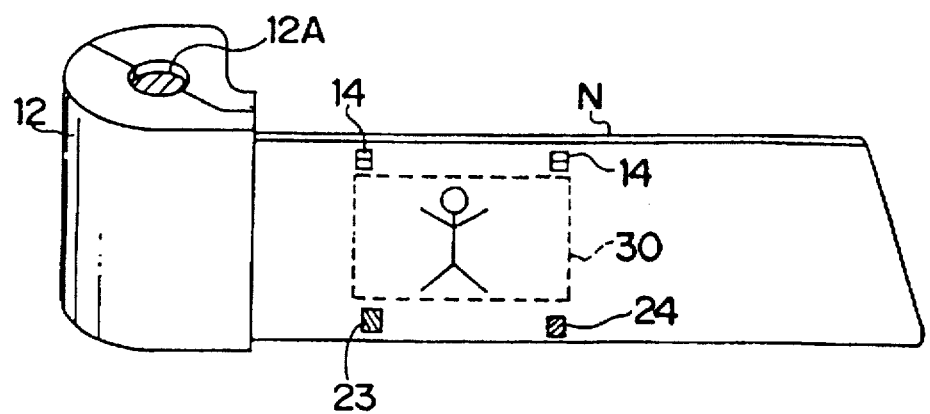

FIG. 21 is a perspective view illustrating a position at which a developed mark is recorded.

DESCRIPTION OF THE PREFERRED EMBODIMENTS (First Embodiment)

An image recording system of a first embodiment of the present invention will be described hereinafter with reference to the figures.

In the present first embodiment, a silver halide photosensitive material having the following structure is used as a negative film N. The silver halide photosensitive material has, on a support, at least three types of photosensitive layers including photosensitive silver halide, a binder, and a non-dispersible colorant which releases dispersible dyes either in the portion at which a silver image is formed or in the portion at which no silver image is formed. The photosensitive layers have respectively different photosensitive wavelength regions and respectively different hues after the non-dispersible colorants have undergone developing processing.

First, the structure of a camera 10 serving as an image recording device will be described with reference to FIGS. 1 through 3. FIG. 1 is a schematic sectional view of the camera 10 cut along a horizontal direction. As illustrated in FIG. 1, the camera 10 includes a substantially box-shaped casing 11. An accommodating space for accommodating a substantially cylindrical film case 12 is formed at one side within the casing 11. A drive shaft 16 (see FIG. 2) which is connected to an unillustrated drive member is disposed beneath the accommodating space.

A lens 13 is fixed to the front surface (the top surface in FIG. 1) of the casing 11. A shutter (unillustrated) connected to an unillustrated drive circuit is mounted within the casing 11 in a vicinity of the lens 13. The shutter is usually closed. By opening and closing the shutter instantaneously, light is guided to the interior of the casing 11. A shutter button 28 (see FIG. 2) and an unillustrated winding instructing button for instructing winding of the negative film N are provided at the top portion of the casing 11.

A winding reel 26 is disposed within the casing 11 at the side opposite the side at which the film case 12 is set. As illustrated in FIG. 2, a drive shaft 26A, which is connected to an unillustrated drive member, is inserted in the central portion of the winding reel 26.

A substantially cylindrical spool 12A is rotatably attached to the central portion of the film case 12 along the axial direction of the film case 12. The negative film N is wound around the spool 12A, and the inner side end of the negative film N wound in a roll-form is anchored to the spool 12A. Further, the other end of the negative film N is exposed from an opening portion formed in the film case 12 along the axial direction thereof.

The film case 12 is set in the camera 10 such that the surface of the negative film N which surface is coated with a photosensitive material is disposed at the side of the casing 11 to which the lens 13 is fixed. When the film case 12 is set in the camera 10, the drive shaft 16 is inserted in the spool 12A. The end portion of the negative film N exposed from the film case 12 is anchored to the winding reel 26. In this way, when the shutter button 28 is operated, light guided into the casing 11 exposes a predetermined region of the surface at the side of the negative film N at which the photosensitive material is applied, i.e., the light exposes a region within a frame 30. After exposure, the negative film N is withdrawn from the film case 12, and when the winding instructing button is operated, the negative film N is wound into the film case 12.

A plurality of pairs of perforations 14 are provided in advance in one transverse direction end portion of the negative film N. Each pair of perforations 14 includes a leading end side perforation 14A and a trailing end side perforation 14B. A line extending from the leading end side of the leading end side perforation 14A and a line extending from the trailing end side of the trailing end side perforation 14B correspond to positions of the leading edge and the trailing edge of the frame 30, respectively. Further, the distance between the trailing edge of the trailing end side perforation 14B and the leading edge of the leading end side perforation 14A of the subsequent pair of perforations 14 (i.e., the distance between a frame 30 and the next frame 30) is different than the length of the frame 30 (the distance from the leading edge of the perforation 14A to the trailing edge of the perforation 14B). A pair of positioning sensors (not shown), which detect that the pair of perforations 14A, 14B are respectively at predetermined positions, is provided within the casing 11.

An exposure section 22 is provided between the set film case 12 and the winding reel 26. When a frame 30 on the negative film N is exposed, the exposure section 22 writes an exposed mark 24, which shows that the frame 30 has been exposed, on a predetermined position of the end portion of the negative film N opposite the end portion in which the perforations 14 are formed.

As illustrated in FIG. 3, an LED 36, a cover 38 which covers the LED 36 from above, and an LED driving portion 40 which drives the lighting operation of the LED 36 are provided in the exposure section 22. Due to the cover 38, light from the LED 36 is illuminated only to a predetermined region R on the negative film N. In this way, the rectangular exposed mark 24 illustrated in FIG. 2 is written on the negative film N without regions of the negative film N other than the region R being photosensitized. In FIG. 3, arrow B indicates the conveying direction of the negative film N.

The light amount of the light emitted from the LED 36 is set to be greater than or equal to 2 times the amount of light for obtaining a maximum density $D_{max}$ on the negative film N, and preferably greater than or equal to 5 times, and more preferably greater than or equal to 10 times. As a result, the exposed mark 24 becomes not a latent image but a silver image which is optically recognizable. An LED which emits red light may be used as the LED 36 for example. However, an LED which emits light of a different wavelength such as green light, blue light, ultraviolet light, infrared rays or the like may also be used.

As illustrated in FIG. 2, a write control section 20, which includes a microcomputer and controls writing of the exposed mark 24 onto the negative film N, is provided within the casing 11. The write control section 20 is connected to the LED driving portion 40, an unillustrated drive member connected to the drive shaft 16, an unillustrated drive member connected to the drive shaft 26A, the aforementioned positioning sensors, an unillustrated detecting circuit for detecting that the shutter button 28 has been operated, an unillustrated drive circuit for opening and closing the shutter, and an unillustrated detecting circuit which detects that the winding instructing button has been operated. Further, an unillustrated photography lock button, which stops operation of the write control section 20 and releases the stopping of the operation, is provided at the top portion of the casing 11.

Next, the structure of a developing device 50 which develops the negative film N which has been photographed by the camera 10 will be described by using FIGS. 5 through 8. As illustrated in FIG. 5, the developing device 50 includes a substantially parallelepiped housing 51. A discharging portion 53 for discharging negative films which have been developed is provided at the upper wall of the housing 51.

As illustrated in FIG. 6A, a control section 72 which includes a microcomputer and controls operation of the developing device 50 is provided within the developing device 50. A film case loading section 54, into which a film case 12 accommodating an exposed negative film N is loaded, is also provided in the developing device 50. A drive shaft (not shown), which is inserted into the spool 12A when the film case 12 is loaded, is provided in the film case loading section 54. The drive shaft is connected to an unillustrated drive circuit which is in turn connected to the control section 72. A plurality of pairs of conveying rollers 35 and a plurality of pairs of conveying rollers 31 are disposed from a vicinity of the film case loading section 54 to the discharging portion 53. The negative film N withdrawn from the film case 12 loaded in the film case loading section 54 is conveyed by the conveying rollers 35, 31 to the discharging portion 53. A reading section 56, which optically reads the exposed mark 24 recorded on the negative film N, is provided at the negative film N conveying direction downstream side of the film case loading section 54.

As illustrated in FIG. 7A, the reading section 56 is provided with a substantially parallelepiped casing 57. A groove 57B is provided in the casing 57 in the horizontal direction from a side surface 57A of the casing 57. The negative film N is conveyed such that the end portion thereof on which the exposed mark 24 is recorded passes through the groove 57B.

The reading section 56 is equipped with light sources 81A, 81B which are disposed above specific positions of the locus of movement of the perforations 14 of the negative film N and which emit infrared rays (in the present first embodiment, infrared rays of a wavelength of 800 nm or more). The distance between the light sources 81A, 81B is substantially the same as the distance between the pair of perforations 14A, 14B formed in the negative film N. Further, the light sources 81A, 81B are connected to the control section 72. Photosensors 83A, 83B are disposed directly beneath the light sources 81A, 81B under the conveying path of the negative film N. The photosensors 83A, 83B are connected to the control section 72. When the perforations 14 of the negative film N are disposed directly beneath the light sources 81A, 81B, the photosensors 83A, 83B output detection signals to the control section 72.

As illustrated in FIG. 7B, a light source 80 is provided at the upper portion of the interior of the casing 57. When a pair of perforations 14A, 14B of the negative film N are disposed directly beneath the light sources 81A, 81B respectively, the light source 80 irradiates infrared rays to a position directly above the exposed mark 24 corresponding to this pair of perforations 14A, 14B. An LED driving portion 82, which drives the lighting operation of the light source 80, is provided at the reading section 56 and is connected to the control section 72. An infrared ray CCD 84 is disposed beneath the light source 80. The infrared ray CCD 84 converts into voltage the light amount of the light which is emitted from the light source 80 and transmitted through the negative film N. The infrared ray CCD 84 is connected to a drive circuit (not shown) which is connected to the control section 72 and to an A/D (analog-digital) converter 71 connected to the control section 72.

As illustrated in FIG. 6A, an application device 58 is disposed at the negative film N conveying direction downstream side of the reading section 56. The application device 58 applies water as an image forming solvent to the negative film N.

As shown in FIG. 8, the application device 58 is equipped with a pair of conveying rollers 114 for conveying, along the direction of arrow A, the negative film N which is conveyed from the reading section 56. Further, a spray tank 112 is provided in the application device 58 at the negative film N conveying direction downstream side of the conveying rollers 114. The spray tank 112 sprays water onto the negative film N. When an arbitrary pair of perforations 14A, 14B of the negative film N are positioned directly beneath the light sources 81A, 81B respectively and the leading end of the negative film N is positioned at the conveying direction downstream side of the application device 58, the spray tank 112 is disposed at a position which is directly above a frame 30 corresponding to another pair of perforations 14.

An exhaust pipe 130 provided with an unillustrated valve extends from the upper portion of the spray tank 112. The valve is connected to the control section 72 and is opened and closed by signals from the control section 72.

A nozzle plate 122 is mounted to the lower end portion of the spray tank 112. The nozzle plate 122 is formed by an elastically deformable, thin, rectangular plate. The nozzle plate 122 is connected to an unillustrated mechanism which is connected to the control section 72 and which elastically deforms the nozzle plate 122. A plurality of nozzle holes 124 are formed in the nozzle plate 122 at equal intervals along a direction orthogonal to the conveying direction of the negative film N (the direction of arrow A). The diameters of the nozzle holes 24 are of a size (e.g., several tens of μm) such that the nozzle plate 122 can spray water when the valve of the exhaust pipe 130 is open or when the valve of the exhaust pipe 130 is closed and the nozzle plate 122 is deformed upward as illustrated in FIG. 8, and such that the spraying of the water can be stopped when the valve of the exhaust pipe 130 is closed and the nozzle plate 122 is stationary. Further, the distance between the nozzle holes 124 at both ends is substantially the same as the width of the negative film N. In this way, water can be applied to the entire region of the negative film N which is disposed beneath the spray tank 112.

A sub-tank 138, in which water to be supplied to the spray tank 112 is stored, is disposed to the side of the spray tank 112. A water bottle 132, which stores water to be supplied to the sub-tank 138, is disposed diagonally underneath the spray tank 112. A filter 134 which filters water is disposed above the water bottle 132. A water pipe 142 is disposed between the water bottle 132 and the filter 134. One end of the water pipe 142 is inserted into the water bottle 132, whereas the other end is connected to the filter 134. A pump 136, which is connected to the control section 72, is connected on the route of the water pipe 142. In this way, the water within the water bottle 132 can be sucked up. Further, a water pipe 144, which connects the filter 134 and the upper portion of the sub-tank 138, is disposed between the filter 134 and the upper portion of the sub-tank 138. Further, a water pipe 146, which connects the lower portion of the sub-tank 138 and the spray tank 112, is disposed between the lower portion of the sub-tank 138 and the spray tank 112. Moreover, a circulating pipe 148 is disposed between the sub-tank 138 and the water bottle 132. One end of the circulating pipe 148 is inserted into the sub-tank 138 from the bottom portion of the sub-tank 138, whereas the other end of the circulating pipe 148 is connected to the water bottle 132.

Accordingly, when the pump 136 is operated, water is sent from the water bottle 132 to the filter 134. The water which is filtered by passing through the filter 134 is sent to the sub-tank 138. The filtered water is temporarily stored in the sub-tank 138, and thereafter, is sent to the spray tank 112. Water in the sub-tank 138 in excess of the amount which is needed is returned to the water bottle 132 through the circulating pipe 148.

A tray 140, whose bottom portion is connected to the circulating pipe 148, is disposed beneath the spray tank 112. When no negative film N is disposed directly beneath the spray tank 112, the water sprayed from the spray tank 112 as well as the water which leaks out from the spray tank 112 when the valve of the exhaust pipe 130 is open are collected in the tray 140, and are returned to the water bottle 132 through the circulating pipe 148.

Wiping rollers 113A, 113B, for wiping water from the unexposed portions of the negative film N, are disposed at the negative film N conveying direction upstream side of the spray tank 112. The wiping roller 113A is connected to an unillustrated moving member which is connected to the control section 72, and moves from a position of being above the negative film N (the position illustrated in FIG. 8) to a position of contacting the upper surface of the negative film N. Further, the wiping roller 113B is connected to an unillustrated moving member which is connected to the control section 72, and moves from a position of being beneath the negative film N (the position illustrated in FIG. 8) to a position of contacting the lower surface of the negative film N. The layers at the surfaces of the wiping rollers 113A, 113B are formed from a water-absorbing material. When the wiping rollers 113A, 113B contact the negative film N, they wipe off the water which has adhered to the negative film N.

As illustrated in FIG. 6A, a heating section U is provided at a position between the application device 58 and the discharging portion 53.

The heating section U is equipped with conveying rollers 37A, 37B around which the negative film N is entrained. When an arbitrary pair of perforations 14A, 14B of the negative film N are disposed directly under the light sources 81A, 81B respectively and the leading end of the negative film N is positioned at the conveying direction downstream side of the conveying rollers 37A, 37B, the conveying roller 37A is disposed at a position between a frame 30, which is n frames ahead of the frame 30 corresponding to that pair of perforations 14A, 14B, and a frame 30, which is (n−1) frames ahead of the frame 30 corresponding to that pair of perforations 14A, 14B. Further, in this case, the conveying roller 37B is disposed at a position between the frame 30, which is n frames ahead of the frame 30 corresponding to that pair of perforations 14A, 14B, and a frame 30, which is (n+1) frames ahead of the frame 30 corresponding to that pair of perforations 14A, 14B.

The heating section U is also provided with a supply reel 60 and a take-up reel 70. A processing member K, which has a layer including a mordant, is wound in roll form around the supply reel 60. The take-up reel 70 is connected to an unillustrated drive member connected to the control section 72, and takes up the processing member K. Conveying rollers 62A, 62B are disposed at positions opposing the conveying rollers 37A, 37B, respectively. The processing member K which has been pulled out from the supply reel 60 is entrained about the conveying rollers 62A, 62B. A rectangular parallelepiped heater 66, which is connected to a drive circuit connected to the control section 72, is disposed at a position opposing a frame 30 disposed between the conveying rollers 37A, 37B when an arbitrary pair of perforations 14A, 14B of the negative film N are disposed directly beneath the light sources 81A, 81B respectively and the leading end of the negative film N is disposed at the conveying direction downstream side of the conveying rollers 37A, 37B. The size of the surface of the heater 66 at the conveying rollers 37A, 37B side is substantially the same as the size of the frame 30. The heater 66 is connected to an unillustrated moving member which is in turn connected to the control section 72. The heater 66 thereby moves from a position of being separated from the frame 30 disposed between the conveying rollers 37A, 37B (the position of FIG. 6A) to a position at which the heater 66 contacts the frame 30 disposed between the conveying rollers 37A, 37B (the position of FIG. 6B).

A cutter 33, which cuts the negative film N and is connected to an unillustrated drive circuit connected to the control section 72, is disposed at a position between a frame 30 and the subsequent frame 30 when the former frame 30 is disposed between the conveying rollers 37A, 37B. The conveying rollers 35 are disposed at the conveying direction upstream side of the cutter 33, and the conveying rollers 31 are disposed at the conveying direction downstream side of the cutter 33. The conveying rollers 35, 31 are connected to separate drive members which are connected to the control section 72. In this way, the conveying rollers 35, 31 can be rotated in the same direction or in different directions.

The developing device 50 is equipped with an unillustrated operation panel which is disposed at the outer side of the housing 51 and has a start button. When the start button is pushed, control of the developing device 50 by the control section 72 is implemented.

Next, operation of the present first embodiment will be described. First, processing for writing the exposed mark 24 by the camera 10 illustrated in FIGS. 1 and 2 will be explained.

A photographer loads the film case 12 into a predetermined position of the camera 10. Thereafter, when the photographer releases the unillustrated photography lock button so that the camera 10 is in a photographable state, the control routine illustrated in FIG. 4 is started by the write control section 20.

In step 202 in FIG. 4, the winding reel 26 is driven so that the negative film N is conveyed. In subsequent step 204, by monitoring the signals from the positioning sensors, it is judged whether a pair of perforations 14A, 14B are disposed at predetermined positions, i.e., it is judged whether a frame 30 of the negative film N is set at the predetermined photography position. In a case in which a frame 30 of the negative film N is set at the predetermined photography position, the routine proceeds to step 206 where the winding reel 26 is stopped such that conveying of the negative film N is stopped. In subsequent step 208, a judgment is made as to whether the shutter button 28 has been pushed.

If the shutter button 28 has not been pushed, the routine proceeds to step 210 where a judgment is made as to whether winding of the negative film N has been instructed by the unillustrated winding instructing button. If winding has not been instructed, the routine returns to step 208.

When it is judged in step 208 that the shutter button 28 has been pushed, the routine proceeds to step 214.

In step 214, the shutter is opened and closed so as to carry out ordinary photography, and the LED driving portion 40 of the exposure section 22 illustrated in FIG. 3 is driven. Due to the driving of the LED driving portion 40, red light is emitted from the LED 36, and the exposed mark 24 is written on a predetermined position of the negative film N illustrated in FIG. 2. Due to step 214, photographing of the one frame 30 set at the photography position (i.e., exposure of the image) and writing of the exposed mark 24 which shows that that frame 30 has been exposed are completed. The routine then returns to step 202 in order to set the next frame 30 at the photography position.

By repeating above-described steps 202 through 214, the frames 30 of the negative film N are photographed frame-by-frame, and exposed marks 24 are written on predetermined positions corresponding to the respective frames 30.

Thereafter, when winding is instructed by the winding instructing button, the judgment in step 210 is affirmative, and the routine proceeds to step 212. In step 212, the drive shaft 16 which is inserted into the spool 12A is wound in the direction opposite to the conveying direction at the time of photographing, so that the negative film N is wound up into the film case 12.

Due to the above-described exposed mark writing processing, exposed marks 24 are written only at the frames 30 which have been exposed on the negative film N.

Next, description of negative film N heat developing processing by the developing device 50 illustrated in FIGS. 5 and 6A will be explained.

An operator loads a film case 12 into the film case loading section 54 of the developing device 50, and adheres a leader member of a predetermined length to the leading end of the negative film N accommodated in the film case 12. Thereafter, when the operator operates the unillustrated start button, the control routine illustrated in FIG. 9 is started by the control section 72.

In step 250 of FIG. 9, initial setting is carried out. Specifically, the light sources 81A, 81B, the photosensors 83A, 83B, and the infrared ray CCD 84 are driven. Further, the valve connected to the exhaust pipe 130 is closed, and the pump 136 is driven by an unillustrated drive circuit so that water is circulated in the application section 58. Moreover, the mechanism for elastically deforming the nozzle plate 122 is driven so that the nozzle holes 124 are elastically deformed upward. In this way, the deformed nozzle plate 122 applies pressure to the water within the spray tank 112, and the water within the spray tank 112 is sprayed out from the nozzle holes 124. When the negative film N is disposed beneath the spray tank 112, the sprayed water is applied to the negative film N. When no negative film N is disposed beneath the spray tank 112, the sprayed water is collected in the tray 140, and is returned to the water tank 132 through the circulating pipe 148.

The wiping rollers 113A, 113B are, by moving members respectively connected thereto, disposed at the positions illustrated in FIG. 8 at which the wiping rollers 113A, 113B are separated from the conveying path of the negative film N. The heater 66 is warmed and the temperature thereof is maintained at a predetermined temperature by an unillustrated drive circuit.

A counter X for counting the number of exposed marks 24, i.e., the number of frames which have been exposed, is initially set to 0. A counter Y for counting the number of frames 30 which have undergone heating processing is initially set to 1. A counter Z for counting the number of frames for which reading of the exposed mark 24 has been attempted is initially set to 0.

In subsequent step 252, the drive shaft inserted in the spool 12A and the conveying rollers 35, 31 are driven, so that conveying of the negative film N begins.

In step 254, due to signals from the photosensors 83A, 83B of the reading section 56, a judgment is made as to whether a pair of perforations 14A, 14B of the negative film N are disposed at predetermined positions, i.e., a judgment is made as to whether a frame 30 of the negative film N has reached a predetermined reading position.

When a frame 30 of the negative film N has reached the predetermined reading position of the reading section 56, the routine proceeds to step 256 where the drive shaft inserted in the spool 12A and the conveying rollers 35,31 are stopped. In subsequent step 258, reading of the exposed mark 24 is attempted. Specifically, the LED driving portion 82 is driven, and the light source 80 is lit. Next, the transmitted light amount data from the A/D converter 71 connected to the infrared ray CCD 84 is fetched, and driving of the LED driving portion 82 is stopped.

In subsequent step 260, on the basis of the fetched transmitted light amount data, a judgment is made as to whether an exposed mark 24 has been recorded at the position corresponding to the frame 30 disposed at the reading position. Here, for example, if the transmitted light amount data is less than a predetermined threshold value, it is determined that the exposed mark 24 has been recorded, whereas if the transmitted light amount data is greater than or equal to the threshold value, it is determined that the exposed mark 24 has not been recorded.

If the exposed mark 24 has not been recorded, the routine proceeds to step 264. If the exposed mark 24 has been recorded, the routine proceeds to step 262 where the counter X is incremented by 1, and the routine then proceeds to step 264.

In step 264, the counter Z is incremented by 1. In subsequent step 266, a judgment is made as to whether the counter X is 0, i.e., whether there is an exposed frame 30. If X is 0, the routine proceeds to step 276, whereas if X is not 0, the routine proceeds to step 268.

In step 268, a judgment is made as to whether the counter Z is greater than or equal to (n+1), i.e., as to whether a frame 30 is disposed in the heating section U.

If no frame 30 is disposed in the heating section U, the routine returns to step 252. If there is a frame 30 in the heating section U, in step 270, the frame 30 disposed in the heating section U is heat-developed. Specifically, the heater 66 is moved by an unillustrated moving member to the position illustrated in FIG. 6B, and the frame 30 (the surface thereof on which the photosensitive layer is formed) and the processing layer surface of the processing member K are pressed tightly together. After heating is carried out for a predetermined time, the heater 66 is moved by the moving member to the position illustrated in FIG. 6A at which the heater 66 is separated from the frame 30.

In this way, the frame 30, which is disposed in the heating section U and to which water has been applied, is superposed with the surface of the processing member K on which the processing layer is formed, and is heated (heat-developed) at a predetermined temperature for a predetermined time. Due to the reaction of components contained in the photosensitive layer and the processing layer, a color image of at least three colors is formed on the negative film N.

Next, the take-up reel 70 is rotated by an unillustrated drive member, and the processing member K is taken up by an amount of approximately one frame. An unused portion of the processing member K is thereby disposed between the conveying rollers 62A, 62B.

In subsequent step 272, it is judged whether Y has reached X, i.e., whether all of the exposed frames 30 have been developed. If Y has not reached X, in step 274, Y is increased by 1, and the routine returns to step 252.

If Y has reached X, in step 276, the cutter 33 is operated by an unillustrated drive circuit, and the negative film N is cut at a position between a developed frame 30 and a frame 30 which has not been exposed. Further, driving of the member which elastically deforms the nozzle plate 122 is stopped so that spraying of the water from the nozzle holes 124 is stopped. Moreover, the wiping rollers 113A, 113B are moved by unillustrated moving members to positions of contacting the negative film N.

In subsequent step 278, the conveying rollers 35, 31 and the drive shaft of the spool 12A are driven for a predetermined time. At this time, the conveying rollers 35 and the drive shaft of the spool 12A are rotated in directions opposite to the rotating direction of the conveying rollers 31 (i.e., the conveying rollers 35 and the drive shaft of the spool 12A are rotated in the direction of the film case loading section 54). In this way, the developed negative film N is discharged from the discharging portion 53, and after water has been wiped by the wiping rollers 113A, 113B from the unused negative film N, the unused negative film N is rewound into the film case 12. In step 278, the time over which the conveying rollers 35, 31 and the drive shaft of the spool 12A are driven is set to a time which is sufficient to allow the developed negative film N to be discharged from the position of the cutter 33 out from the discharging portion 53 and the unused negative film N to be rewound into the film case 12.

In subsequent step 280, the settings are canceled, and the routine ends. In the cancellation of the settings, the driving of the light sources 81A, 81B, the photosensors 83A, 83B, the infrared ray CCD 84, the pump 136, and the heater 66 is stopped, and the valve connected to the exhaust pipe 130 is opened. In this way, the water in the spray tank 112 falls down from the nozzle holes 124 into the tray 140 therebeneath, and is returned to the water tank 132 through the circulating pipe 148.

In accordance with the above-described heat developing processing carried out at the developing device 50, only the exposed frames 30 of the negative film N are heat-developed, and images are formed on the exposed frames 30. Further, the unexposed frames 30 of the negative film N are not heat-developed, and are rewound into the film case 12. In this way, developing processing of unexposed frames 30, which is unnecessary processing, can be eliminated, and the unexposed frames can be reused.

(Second Embodiment)

A second embodiment of the present invention will be described hereinafter with reference to the drawings.

First, the structure of the present second embodiment will be described with reference to FIGS. 10 through 12. Structures which are the same as those of the previously-described first embodiment are denoted by the same reference numerals, and description thereof is omitted.

The camera 10 of the image recording system of the present second embodiment, which camera 10 is illustrated in FIG. 11, differs from the camera 10 of the first embodiment in that the respective exposure sections are different, and in that the camera 10 of the present second embodiment is provided with a shutter speed detecting circuit 150 which is connected to the write control section 20 and detects the speed of the shutter. First, the structure of an exposure section 22A used in the camera 10 of the present second embodiment will be described with reference to FIG. 10.

As illustrated in FIG. 10, in the exposure section 22A, a cylindrical lens 39 is provided beneath the LED 36. The cylindrical lens 39 focuses the red light from the LED 36 in a line form along a direction (see FIG. 11) perpendicular to the conveying direction of the negative film N (the direction of arrow B) onto a predetermined region of the end portion of the negative film N opposite the end portion in which the perforations 14 are formed. As a result, by controlling the timing of the turning on and off of the LED 36 and the timing of the conveying of the negative film N, a bar code 25 of a desired pattern can be written in a vicinity of a frame 30 as illustrated in FIG. 11.

In the developing device of the image recording system of the present second embodiment, the structure of a reading section 56S illustrated in FIG. 12 differs from that of the reading section 56 of the first embodiment (see FIG. 7B), and will therefore be described hereinafter.

As illustrated in FIG. 12, the reading section 56S is provided with a light source 89. When a pair of perforations 14A, 14B of the negative film N are disposed directly beneath the light sources 81A, 81B respectively, the light source 89 illuminates infrared rays to a rectangular region at which the exposed mark 24 corresponding to the pair of perforations 14A, 14B and the bar code 25 are recorded. The light source 89 is connected to the LED driving portion 82. An infrared ray CCD 85 is disposed beneath the light source 89. The infrared ray CCD 85 converts to voltage the light amount of the light which has been irradiated from the light source 89 and transmitted through the rectangular region of the negative film N. The infrared ray CCD 85 is connected to a drive circuit (not shown) connected to the control section 72 and to an A/D (analog-digital) converter 87 connected to the control section 72.

Next, operation of the present second embodiment will be explained by using FIGS. 13 and 14. In the flowcharts of FIGS. 13 and 14, processings which are the same as those of the first embodiment are denoted by the same step numbers, and description thereof will be omitted.

First, the control routine of FIG. 13 is executed by the write control section 20 within the camera 10. In this control routine, when it is judged in step 208 that the shutter button 28 has been pressed, in step 214, the shutter is opened and closed instantaneously so that photographing is carried out. In subsequent step 216, shutter speed data is fetched from the shutter speed detecting circuit 150. In step 218, if the fetched shutter speed data is greater than or equal to an upper limit value set in advance, it is judged that the frame 30 is underexposed, whereas if the fetched shutter speed data is less than or equal to a lower limit value set in advance, it is judged that the frame 30 is overexposed. In step 220, the winding reel 26 is driven, and while the negative film N is being conveyed, the exposed mark 24 and the bar code 25 expressing that the frame 30 is underexposed or overexposed are written on the end portion of the negative film N at the opposite side of the end portion in which the perforations 14 of the frame 30 are formed, by controlling the timing of the driving of winding reel 26 and the timing of the lighting of the light source 89. The routine then returns to step 204.

In this way, exposed marks 24 and bar codes 25, which express the exposure conditions of the respective frames 30, are written so as to correspond to the exposed frames 30 of the negative film N.

In the control routine of FIG. 14 which is executed by the control section 72 within the developing device 50, the conveying of the negative film N by the conveying rollers 35, 31 is stopped in step 256. Thereafter, in step 282, reading of the exposed mark 24 and the bar code 25 is attempted. Specifically, the LED driving portion 82 is driven, and the light source 89 is lit. The transmitted light amount data is fetched from the A/D converter 87 connected to the infrared ray CCD 85 and is stored in a memory, and the driving of the LED driving portion 82 is stopped.

Next, the routine proceeds to step 260 where, on the basis of the fetched transmitted light amount data, a judgment is made as to whether an exposed mark 24 has been recorded at a position corresponding to the frame 30 which is positioned at the reading position.

In step 268, if a judgment is made that the counter Z is n+1 or more, i.e., if a frame 30 is positioned at the heating section U, in step 286, the bar code 25 is read from the transmitted light amount data which is stored in the memory and corresponds to the Yth frame from the leading end of the negative film N, and the developing conditions of the frame 30 are determined on the basis of the read bar code 25, i.e., on the basis of the exposure conditions. In subsequent step 284, the frame positioned at the heating section U is developed in accordance with the determined developing conditions.

For example, if the read bar code 25 expresses that the frame 30 has been underexposed, the developing time is set to twice the ordinary amount of time. If the read bar code 25 expresses that the frame 30 has been overexposed, the developing time is set to half the ordinary amount of time. In this way, latent images recorded on a negative film N which has been underexposed or overexposed can be developed appropriately.

FIG. 15 is a graph illustrating the relationship between the amount of exposure and the color density of the negative film in a case in which processing is carried out under ordinary developing conditions. The range corresponding to arrow A is a range of exposure amounts of proper exposure. The range corresponding to arrow B is a range of exposure amounts of underexposure. The range corresponding to arrow C is a range of exposure amounts of overexposure.

FIG. 16 illustrates a relationship (a) between the amount of exposure and the color density of an image in a case in which an underexposed negative film N is developed for the ordinary developing time, and a relationship (b) between the amount of exposure and the color density of an image in a case in which an underexposed negative film N is developed for twice the ordinary developing time. As illustrated by these relationships, the width B" between the highest density value and the lowest density value in relationship (a) in range B (i.e., developing for the ordinary developing time) is smaller than the width B' between the highest density value and the lowest density value in relationship (b) in range B (i.e., developing for twice the ordinary developing time). Accordingly, better contrast (a larger difference in maximum and minimum density values within range B) can be obtained in prints which have been developed for twice the ordinary developing time. Moreover, relationship (b) encompasses a range of higher density values than that of relationship (a), i.e., the density values in the width B' are higher than those in the width B". Higher density values are preferred for underexposed frames as the higher densities can compensate for the underexposure.

FIG. 17 illustrates a relationship (a) between the amount of exposure and the color density of an image in a case in which an overexposed negative film N is developed for the ordinary developing time, and a relationship (b) between the amount of exposure and the color density of an image in a case in which an overexposed negative film N is developed for half of the ordinary developing time. As illustrated by these relationships, the width C" between the highest density value and the lowest density value in relationship (a) in range C (i.e., developing for the ordinary developing time) is smaller than the width C' between the highest density value and the lowest density value in relationship (b) in range C (i.e., developing for half the ordinary developing time). Accordingly, better contrast (a larger difference in maximum and minimum density values within range C) can be obtained in prints which have been developed for half the ordinary developing time. Moreover, relationship (b) encompasses a range of lower density values than that of relationship (a), i.e., the density values in the width C' are lower than those in the width C". Lower density values are preferred for overexposed frames as the lower densities can compensate for the overexposure.

In this way, in accordance with the present second embodiment, exposure conditions per frame can be recorded as bar codes 25. At the developing device 50, the bar codes 25 can be read per frame, and heating (heat developing) of exposed frames can be carried out at appropriate developing conditions on the basis of the read bar codes 25.

(Third Embodiment)

An image recording system of the third embodiment of the present invention will be described hereinafter with reference to FIGS. 18 through 21.

First, the structure of the present third embodiment will be explained by using FIG. 18. Structures which are the same as those of the previously-described first embodiment are denoted by the same reference numerals, and description thereof is omitted.

In the developing device 50C of the image recording system of the present third embodiment, a developed mark recording section 94, which records on the negative film N a developed mark 23 (see FIG. 21) showing that a frame 30 has been developed, is provided at the negative film N conveying direction downstream side of the heating section U. When an arbitrary pair of perforations 14A, 14B of the negative film N are disposed directly beneath the light sources 81A, 81B of the reading section 56 respectively and the leading end of the negative film N is disposed at the conveying direction downstream side of the developed mark recording section 94, the developed mark recording section 94 is disposed at a position opposing a frame 30 which is (n+1) frames ahead of the frame 30 corresponding to that pair of perforations 14A, 14B.

The developed mark recording section 94 has the same structure as that of the exposure section 22 illustrated in FIG. 3. An unillustrated LED driving portion of the developed mark recording section 94 is connected to the control section 72. On the basis of a signal from the control section 72, light of a light amount two or more times greater than the light amount for obtaining a maximum density $D_{max}$ at the negative film N is illuminated. In this way, an optically recognizable developed mark 23 is recorded at a predetermined position corresponding to a frame 30 as illustrated in FIG. 21.

The developing device 50C of the present third embodiment differs from the developing device 50 of the first embodiment (see FIG. 6A) in that the developing device 50C does not have a cutter 33. Further, the developing device 50C does not have a discharging portion 53. Instead, the developing device 50C includes a take-up roll 41 which is provided at the negative film N conveying direction downstream side of the developed mark recording section 94.

In addition to the structural elements of the reading section 56 of the first embodiment, the reading section 56 of the present third embodiment is also provided with an unillustrated developed mark light source which irradiates infrared rays. When a pair of perforations 14A, 14B of the negative film N are disposed directly beneath the light sources 81A, 81B respectively, the developed mark light source is positioned directly above the developed mark 23 corresponding to this pair of perforations 14A, 14B. Further, an unillustrated developed mark LED driving portion, which is connected to the control section 72 and drives the lighting operation of the developed mark light source, is provided at the reading section 56 of the present third embodiment.

Moreover, an unillustrated developed mark infrared ray CCD is provided under the developed mark light source. The developed mark infrared ray CCD converts into voltage the light amount of the light which has been irradiated from the light source and which has been transmitted through the negative film N. The developed mark infrared ray CCD is connected to a drive circuit (not shown) connected to the control section 72 and to an A/D (analog-digital) converter (not shown) connected to the control section 72.

In the developing device 50C of the present third embodiment, the length of a leader member for guiding the negative film N along the conveying path is substantially the same as the length of the conveying path from the film case loading section 54 to the take-up roll 41. One end of the leader member is anchored to the outer periphery of the take-up roll 41.

Next, negative film N heat developing processing effected by the developing device 50C illustrated in FIG. 18 will be described. An operator loads a film case 12 into the film case loading section 54 of the developing device 50C, and adheres the leader member to the leading end of the negative film N accommodated in the film case 12. Thereafter, when the operator operates an unillustrated start button, the control routine illustrated in FIGS. 19 and 20 is started by the control section 72.

In step 300 of FIG. 19, initial setting is carried out in the same way as in step 250 of the first embodiment, but here, the developed mark infrared ray CCD is also driven. Further, a counter X for counting the number of exposed marks 24, a counter Y for counting the number of frames 30 subjected to heating processing, a counter Z for counting the number of frames for which reading of an exposed mark 24 has been attempted, a counter P for counting the number of developed marks 23, and a counter Q for counting the number of times writing processing of a developed mark 23 has been carried out, are respectively initially set to 0.

In subsequent step 302, the total number of frames of the negative film N is fetched by input from an unillustrated operation panel.

In next step 304, the drive shaft inserted in the spool 12A and the conveying rollers 35, 31 are driven, so that conveying of the negative film N begins.

In subsequent step 306, due to signals from the photosensors 83A, 83B of the reading section 56, a judgment is made as to whether a pair of perforations 14A, 14B of the negative film N are disposed at predetermined positions, i.e., it is judged whether a frame 30 of the negative film N has reached the predetermined reading position.

When a frame 30 of the negative film N has reached the predetermined reading position of the reading section 56, the routine proceeds to step 308 where the drive shaft inserted in the spool 12A and the conveying rollers 35, 31 are stopped. In subsequent step 310, reading of the exposed mark 24 and the developed mark 23 are attempted. Specifically, the LED driving portion 82 and the developed mark LED driving portion are driven so that the light source 80 and the developed mark light source are lit. The transmitted light amount data are fetched from the A/D converter 71 connected to the infrared ray CCD 84 and from the A/D converter connected to the developed mark infrared ray CCD, and the driving of the LED driving portion 82 and the developed mark LED driving portion is stopped.

In subsequent step 312, on the basis of the transmitted light amount data fetched from the A/D converter 71, it is judged whether an exposed mark 24 has been recorded at a position corresponding to the frame 30 positioned at the reading position.

If no exposed mark 24 has been recorded, in step 314, on the basis of the transmitted light amount data fetched from the A/D converter connected to the developed mark infrared ray CCD, a judgment is made as to whether a developed mark 23 has been recorded at a position corresponding to the frame 30 positioned at the reading position.

If no developed mark 23 has been recorded, the routine proceeds to step 324. If a developed mark 23 has been recorded, in step 316, the operator is notified that there is an error, and the routine proceeds to step 352. Any of various methods of notifying the operator may be used such as sounding an alarm, displaying an error message on a display, lighting a warning lamp, or the like. Or, any combination of such methods may be used.

In step 312, if it is judged that an exposed mark 24 has been recorded, the routine proceeds to step 318 where the counter X is incremented by 1.

In subsequent step 320, on the basis of the transmitted light amount data fetched from the A/D converter connected to the developed mark infrared ray CCD, a judgment is made as to whether a developed mark 23 has been recorded at a position corresponding to the frame 30 positioned at the reading position.

When no developed mark 23 has been recorded, the routine proceeds to step 324. When a developed mark 23 has been recorded, in step 322, P is increased by 1, and the routine proceeds to step 324.

In step 324, Z is increased by 1. In subsequent step 326, a judgment is made as to whether X is 0. When X is 0, the routine proceeds to step 344, whereas when X is not 0, the routine proceeds to step 328.

In step 328, a judgment is made as to whether the counter Z is greater than or equal to (n+1+P), i.e., whether an undeveloped frame 30 is positioned at the heating section U.

If no frame 30 is positioned at the heating section U or if the frame 30 positioned at the heating section U has already been developed, the routine returns to step 304. Further, if the frame 30 disposed at the heating section U has not been developed, in step 330, a judgment is made as to whether Y has reached (X-P), i.e., whether the undeveloped frame 30 positioned at the heating section U has been exposed. If the undeveloped frame 30 positioned at the heating section U has not been exposed, the routine proceeds to step 336. If the undeveloped frame 30 positioned at the heating section U has been exposed, in step 332, the frame 30 positioned at the heating section U is heat developed. Specifically, the heater 66 is moved by an unillustrated moving member connected thereto to the position illustrated in FIG. 6B, and the frame 30 (the surface on which the photosensitive layer is formed) and the processing layer surface of the processing member K are pressed tightly together. After heating is carried out for a predetermined time, the heater 66 is moved by the moving member to the position illustrated in FIG. 6A at which the heater 66 is separated from the frame 30.

In this way, the frame 30, which is disposed in the heating section U and to which water has been applied, is superposed with the surface of the processing member K on which the processing layer is formed, and is heated (heat-developed) at a predetermined temperature for a predetermined time. Due to the reaction of components contained in the photosensitive layer and the processing layer, a color image of at least three colors is formed on the negative film N.

Next, the take-up reel 70 is rotated by a drive member connected thereto, and the processing member K is taken up by an amount of approximately one frame. An unused portion of the processing member K is thereby disposed between the conveying rollers 62A, 62B.

In subsequent step 334, Y is incremented by 1, and the routine proceeds to step 336.

In step 336, a judgment is made as to whether the counter Z is greater than or equal to (n+2+P), i.e., whether a frame 30, which has been developed but for which no developed mark 23 has been recorded at the predetermined position, is disposed at the developed mark recording section 94.

The routine returns to step 304 if there is no frame 30 disposed at the developed mark recording section 94 or if a developed mark 23 has already been recorded at the predetermined position corresponding to the frame 30 disposed at the developed mark recording section 94.

Further, in a case in which the frame 30 disposed at the developed mark recording section 94 has been developed but no developed mark 23 has been recorded at the corresponding predetermined position, in step 338, an unillustrated LED driving portion is driven, the developed mark 23 is recorded at the position illustrated in FIG. 21, and Q is increased by 1. In subsequent step 340, a judgment is made as to whether Q has reached (X-P), i.e., whether there is a frame 30 which has been developed by the heating section U but for which no developed mark 23 has been recorded at the predetermined position.

If there is a frame 30 which has been developed by the heating section U but for which no developed mark 23 has been recorded at the predetermined position, the routine returns to step 304. If developed marks 23 have been recorded for all of the developed frames, in step 342, driving of the member which elastically deforms the nozzle plate 122 is stopped, and spraying of water from the nozzle holes 124 is stopped. Further, the wiping rollers 113A, 113B are moved by unillustrated driving members to positions of contacting the negative film N.

In subsequent step 344, the number of unexposed frames is computed from the fetched total number of frames and number of exposed marks 24. The operator is informed of the number of unexposed frames by a method such as displaying the number on a display or the like.

In next step 346, the conveying rollers 35, 31 and the drive shaft of the spool 12A are driven in directions opposite to the directions in which they had been driven to that time. In this way, after the excess water is wiped from the negative film N by the wiping rollers 113A, 113B, the negative film N is rewound into the film case 12.

In subsequent step 348, a judgment is made as to whether rewinding has been completed. The judgment as to whether rewinding has been completed may be made in the following way for example. The detection signal from the photosensor 83B of the reading section 56, which outputs the detection signal when the perforation 14 has passed directly above, is monitored. A judgment is made as to whether a predetermined time has elapsed from the time the detection signal was last output, i.e., as to whether time sufficient for the negative film N to be conveyed to the film case loading section 54 from the position directly above the photosensor 83B has elapsed.

In subsequent step 350, the driving of the conveying rollers 35, 31 and the drive shaft of the spool 12A are stopped. In step 352, the settings are canceled in the same way as in step 280, and the routine ends.

In accordance with the present third embodiment, exposed and undeveloped frames can be classified accurately on the basis of the existence of exposed marks 24 and the existence of developed marks 23, and heat developing processing is carried out for only those frames which are exposed and undeveloped. Further, the unexposed frames can be used for a subsequent exposure.

Further, when a frame which has not been exposed but has been developed is detected, it can be determined that there has been an error in the recording of the exposed mark 24 or the developed mark 23, and the user can be quickly informed that there has been an error.

Moreover, because the number of remaining unexposed frames is computed and the user is informed of this number, the user can accurately know of the number of frames which can be exposed.

In the above-described first through third embodiments, although images are formed on the negative film N by processing with the processing material K, images may be formed on the processing material K. In this case, it is preferable that the developing device 50 discharges the processing material K on which images have been formed.

Further, in the first through third embodiments, red light is used as the light for recording the exposed mark 24, the bar code 25 and the developed mark 23. However, light of any of various wavelengths, such as infrared rays, red light, green light, blue light, ultraviolet light, and the like may be used provided that a silver image can be formed directly on the photosensitive material.

Moreover, in the first through third embodiments, light is illuminated to the exposed mark 24, the bar code 25 and the developed mark 23, and the information thereof is read from the light amount of the light transmitted therethrough. However, the light amount of reflected light which is reflected by the exposed mark 24, the bar code 25 and the developed mark 23 may be detected.

Infrared rays are used for the light used for reading. However, in addition, light which is difficult for the negative film N to absorb and therefore which does not cause fogging, e.g., ultraviolet light, may be used.

In the second embodiment, the exposed mark 24 and the bar code 25 are recorded on the negative film N. However, the exposed mark 24 may be ommitted, and it can be determined that a frame 30 has been exposed due to a bar code 25 being recorded therefor.

Moreover, in the second embodiment, the exposed mark 24 and the bar code 25 which shows whether the frame 30 is underexposed or overexposed are used as the information relating to exposure. However, in addition, information such as whether a flash was used during exposure, the shutter speed, the photometric values at the time of exposure, the date of exposure, the time of exposure, the print size and the like may be included in the information relating to exposure. By recording such information relating to exposure as a bar code, the amount of information recorded on the negative film N can be greatly increased, and the negative film N can be developed more appropriately by using the plural information. However, information relating to exposure may be displayed by characters or the like.

In the second embodiment, in place of the shutter speed, the size of the diaphragm may be detected, and the developing conditions may be controlled by predicting whether the frame is underexposed or overexposed on the basis of the size of the diaphragm. Further, when a frame is underexposed, developing processing may be repeated.

Moreover, in the second embodiment, the developing time is adjusted on the basis of the exposure conditions. However, the developing temperature, the amount of water to be applied and the like may also be adjusted on the basis of the exposure conditions or other information relating to exposure. For example, the amount of water to be applied may be adjusted by omitting the driving of the member for deforming the nozzle plate 122 from the initial setting in step 250, and instead, adding a step between steps 266 and 268 for, on the basis of the information relating to exposure, determining the time or the like for driving the member for deforming the nozzle plate 122, and driving the member in accordance with the determined conditions. In this case, it is possible to apply water to only the frames 30 and the vicinities thereof.

In the third embodiment, in the step of reading the exposed mark 24, the remaining number of frames 30 which are unexposed and undeveloped may be computed by decreasing the value of the entire number of frames by one each time an exposed frame 30 is detected.

Further, in the third embodiment, instead of input from an operation panel, the entire number of frames of the negative film N may be fetched from magnetic information recorded in advance on the film case 12 or the leading end portion of the negative film N or the like.

What is claimed is:

1. An image recording device which, when a latent image is formed by exposure in a frame on a silver halide photosensitive material, records optically recognizable information relating to exposure at a position corresponding to the frame by light of an exposure amount which is sufficient to generate a silver image without developing.

2. A developing device comprising:

reading means for reading optically recognizable information relating to exposure of a silver halide photosensitive material on which a latent image is formed in a frame, the information relating to exposure being recorded on the silver halide photosensitive material at a position corresponding to the frame by light of an exposure amount which is sufficient to generate a silver image without developing, said reading means reading the information relating to exposure without photosensitizing the silver halide photosensitive material; and developing means for developing the latent image in the frame whose information relating to exposure is read.

3. A developing device according to claim 2, wherein said developing means determines developing conditions on the basis of the read information relating to exposure, and on the basis of the determined developing conditions develops the latent image in the frame whose information relating to exposure is read.

4. A developing device according to claim 2, further comprising:

developed mark recording means for, when the latent image in the frame is developed, recording an optically recognizable developed mark at a second position corresponding to the frame; and developed mark judging means for judging, without photosensitizing the silver halide photosensitive material, whether the developed mark is recorded at the second position corresponding to the frame whose information relating to exposure is read, wherein when no developed mark is recorded at the second position corresponding to the frame whose information relating to exposure is read, said developing means develops the latent image in the frame.

5. A developing device according to claim 4, further comprising:

second developed mark judging means for, when no information relating to exposure is recorded, judging whether the developed mark is recorded at the second position corresponding to a frame for which no information relating to exposure is recorded; and error notifying means for giving notice that an error has been generated when said second developed mark judging means judges that the developed mark is recorded.

6. A developing device according to claim 2, further comprising:

measuring means for measuring a number of read information relating to exposure;

remaining frame number computing means for computing a number of remaining frames from the measured number of information relating to exposure and a total number of frames of the silver halide photosensitive material; and remaining frame number notifying means for giving notice of the number of remaining frames.

7. A developing device according to claim 4, further comprising:

measuring means for measuring a number of read information relating to exposure;

remaining frame number computing means for computing a number of remaining frames from the measured number of information relating to exposure and a total number of frames of the silver halide photosensitive material; and remaining frame number notifying means for giving notice of the number of remaining frames.

8. A developing device according to claim 2, further comprising cutting means for, after developing of the frame corresponding to the information relating to exposure recorded last on the silver halide photosensitive material, cutting the silver halide photosensitive material between said frame and a subsequent frame.

9. A developing device according to claim 8, wherein one end of the silver halide photosensitive material is anchored within a film container, and said developing device further comprises:

rewinding means for, after cutting of the silver halide photosensitive material, rewinding a remaining portion of the silver halide photosensitive material into the film container.

10. A developing device according to claim 4, wherein one end of the silver halide photosensitive material is anchored within a film container, and said developing device further comprises:

rewinding means for, after developing of the frame corresponding to the information relating to exposure recorded last on the silver halide photosensitive material, rewinding the silver halide photosensitive material into the film container.

11. An image recording system comprising:

an image recording device which, when a latent image is formed by exposure in a frame on a silver halide photosensitive material, records optically recognizable information relating to exposure at a position corresponding to the frame by light of an exposure amount which is sufficient to generate a silver image without developing; and a developing device having:

reading means for reading the information relating to exposure without photosensitizing the silver halide photosensitive material; and developing means for developing the latent image in the frame whose information relating to exposure is read.

12. An image recording system according to claim 11, wherein said developing means determines developing conditions on the basis of the read information relating to exposure, and on the basis of the determined developing conditions develops the latent image in the frame whose information relating to exposure is read.

13. An image recording system according to claim 11, wherein said developing device further comprises:

developed mark recording means for, when the latent image in the frame is developed, recording an optically recognizable developed mark at a second position corresponding to the frame; and developed mark judging means for judging, without photosensitizing the silver halide photosensitive material, whether the developed mark is recorded at the second position corresponding to the frame whose information relating to exposure is read, wherein when no developed mark is recorded at the second position corresponding to the frame whose information relating to exposure is read, said developing means develops the latent image in the frame.

14. An image recording system according to claim 13, wherein said developing device further comprises:

second developed mark judging means for, when no information relating to exposure is recorded, judging whether the developed mark is recorded at the second position corresponding to a frame for which no information relating to exposure is recorded; and error notifying means for giving notice that an error has been generated when said second developed mark judging means judges that the developed mark is recorded.

15. An image recording system according to claim 11, wherein said developing device further comprises:

measuring means for measuring a number of read information relating to exposure;

remaining frame number computing means for computing a number of remaining frames from the measured number of information relating to exposure and a total number of frames of the silver halide photosensitive material; and remaining frame number notifying means for giving notice of the number of remaining frames.

16. An image recording system according to claim 13, wherein said developing device further comprises:

measuring means for measuring a number of read information relating to exposure;

remaining frame number computing means for computing a number of remaining frames from the measured number of information relating to exposure and a total number of frames of the silver halide photosensitive material; and remaining frame number notifying means for giving notice of the number of remaining frames.

17. An image recording system according to claim 11, wherein said developing device further comprises:

cutting means for, after developing of the frame corresponding to the information relating to exposure recorded last on the silver halide photosensitive material, cutting the silver halide photosensitive material between the frame which is developed last, and a subsequent frame.

18. An image recording system according to claim 17, wherein one end of the silver halide photosensitive material is anchored within a film container and wherein said developing device further comprises:

rewinding means for, after cutting of the silver halide photosensitive material, rewinding a remaining portion of the silver halide photosensitive material into the film container.

19. An image recording system according to claim 13, wherein one end of the silver halide photosensitive material is anchored within a film container and wherein said developing device further comprises:

rewinding means for, after developing of the frame corresponding to the information relating to exposure recorded last on the silver halide photosensitive material, rewinding the silver halide photosensitive material into the film container.

* * * * *